(12) United States Patent
Matsuda

(10) Patent No.: US 12,285,800 B2
(45) Date of Patent: Apr. 29, 2025

(54) PROCESSING SYSTEM

(71) Applicant: NIKON CORPORATION, Tokyo (JP)

(72) Inventor: Takeshi Matsuda, Saitama (JP)

(73) Assignee: NIKON CORPORATION, Tokyo (JP)

( * ) Notice: Subject to any disclaimer, the term of this patent is extended or adjusted under 35 U.S.C. 154(b) by 762 days.

(21) Appl. No.: 17/441,503

(22) PCT Filed: Mar. 25, 2019

(86) PCT No.: PCT/JP2019/012486
§ 371 (c)(1),
(2) Date: Nov. 23, 2021

(87) PCT Pub. No.: WO2020/194445
PCT Pub. Date: Oct. 1, 2020

(65) Prior Publication Data
US 2022/0161324 A1    May 26, 2022

(51) Int. Cl.
*B22F 10/25* (2021.01)
*B22F 12/00* (2021.01)
(Continued)

(52) U.S. Cl.
CPC .............. *B22F 10/25* (2021.01); *B22F 12/38* (2021.01); *B29C 64/153* (2017.08);
(Continued)

(58) Field of Classification Search
CPC ...... B22F 10/25; B22F 12/38; B22F 2201/00; B22F 2201/10; B23K 26/0853;
(Continued)

(56) References Cited

U.S. PATENT DOCUMENTS

2011/0256253 A1\* 10/2011 Amaya ................. B29C 64/153
425/78
2011/0291331 A1    12/2011 Scott
(Continued)

FOREIGN PATENT DOCUMENTS

CN    104388949 A  \*  3/2015
CN    206060415 U     3/2017
(Continued)

OTHER PUBLICATIONS

Translation of Cn 104388949A, (Year: 2015).\*
(Continued)

*Primary Examiner* — Philip C Tucker
*Assistant Examiner* — Jimmy R Smith, Jr.
(74) *Attorney, Agent, or Firm* — Oliff PLC

(57) ABSTRACT

A processing system is provided with: a support apparatus that supports an object; a processing apparatus that performs an additive processing on the object by supplying powdery materials to the object; a driving power source that generates driving power; a driving power transmission member that transmits the driving power to at least one of the support apparatus and the processing apparatus; a partition member that is disposed between the driving power source and at least a part of the processing apparatus and that has a formed through hole which the driving power transmission penetrates; and a seal member that seals a gap between the driving power transmission member and the partition member.

22 Claims, 17 Drawing Sheets

(51) Int. Cl.
*B29C 64/153* (2017.01)
*B29C 64/236* (2017.01)
*B33Y 10/00* (2015.01)
*B33Y 30/00* (2015.01)

(52) U.S. Cl.
CPC ............ *B29C 64/236* (2017.08); *B33Y 10/00* (2014.12); *B33Y 30/00* (2014.12)

(58) Field of Classification Search
CPC .. B23K 26/144; B23K 26/342; B29C 64/153; B29C 64/165; B29C 64/236; B29C 64/25; B29C 64/371; B29C 64/364; B29C 64/321; B29C 64/343; B29C 64/329; B29C 64/336; B29C 64/209; B29C 64/227; B29C 64/232; B29C 64/241; B33Y 10/00; B33Y 30/00
See application file for complete search history.

(56) References Cited

U.S. PATENT DOCUMENTS

| | | | |
|---|---|---|---|
| 2017/0014909 A1 | 1/2017 | Tanaka et al. | |
| 2017/0136578 A1* | 5/2017 | Yoshimura | B23K 26/0608 |
| 2017/0282245 A1 | 10/2017 | Yasuda et al. | |
| 2021/0035766 A1 | 2/2021 | Nishitani et al. | |

FOREIGN PATENT DOCUMENTS

| | | | |
|---|---|---|---|
| CN | 107263865 A | 10/2017 | |
| CN | 108973124 A | 12/2018 | |
| EP | 3 263 316 A1 | 1/2018 | |
| JP | 2015-196164 A | 11/2015 | |
| JP | 2018-008493 A | 1/2018 | |
| WO | 2010/105742 A2 | 9/2010 | |
| WO | 2010/125701 A1 | 11/2010 | |
| WO | 2018/186294 A1 | 10/2018 | |

OTHER PUBLICATIONS

Dec. 8, 2022 Search Report Issued in European Patent Application No. 19 921 836.3.
Feb. 7, 2023 Office Action Issued in Chinese Patent Application No. 201980096462.9.
Jun. 18, 2019 Search Report issued in International Patent Application No. PCT/JP2019/012486.
Jun. 18, 2019 Written Opinion of the International Searching Authority issued in International Patent Application No. PCT/JP2019/012486.
Nov. 8, 2023 Office Action issued in Chinese Patent Application No. 201980096462.9.
Sep. 6, 2022, Office Action issued in Japanese Patent Application No. 2021-508420.
Jan. 28, 2025 Office Action issued in Japanese Patent Application No. 2023-202606.
Apr. 26, 2024 Office Action issued in Chinese Patent Application No. 201980096462.9.
Aug. 21, 2024 Office Action issued in Chinese Patent Application No. 201980096462.9.
Sep. 20, 2024 Office Action issued in European Patent Application No. 19 921 836.3.

* cited by examiner

FIG. 6

PROCESSING SYSTEM

TECHNICAL FIELD

The present invention relates to a technical field of a processing system that performs a processing operation, for example.

BACKGROUND ART

Patent Literature 1 discloses a processing system that performs a processing operation for forming a build object by melting powder-like materials with an energy beam and then solidifying the molten materials. A technical problem of this type of processing system is to secure a safety of the processing system.

CITATION LIST

Patent Literature

Patent Literature 1: US 2017/014909A1

SUMMARY OF INVENTION

A first aspect provides a processing system that is provided with: a support apparatus that supports an object; a processing apparatus that performs an additive processing on the object by supplying powdery materials to the object; a driving power source that generates a driving power; a driving power transmission member that transmits the driving power to at least one of the support apparatus and the processing apparatus; a partition member that is disposed between the driving power source and at least a part of the processing apparatus and that has a formed through hole which the driving power transmission penetrates; and a seal member that seals between the driving power transmission member and the partition member.

An operation and another advantage of the present invention will be apparent from an embodiment described below.

BRIEF DESCRIPTION OF DRAWINGS

FIG. 6 is a perspective view that illustrates the structure of the second stage apparatus in which the illustration of a part of the partition member is not omitted.

Each of FIG. 11A to FIG. 11E is a cross-sectional view that illustrates an aspect in which a certain area on a workpiece is irradiated with light and build materials are supplied thereto.

Figure 12A:
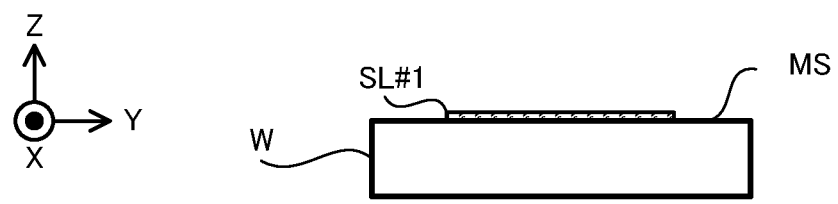
Figure 12B:
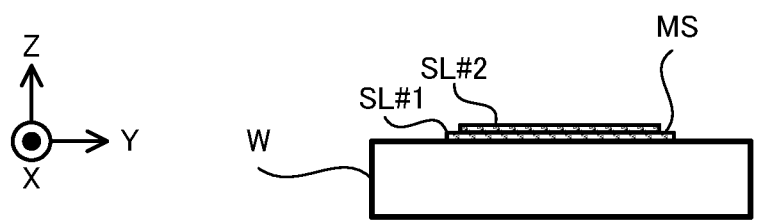
Figure 12C:
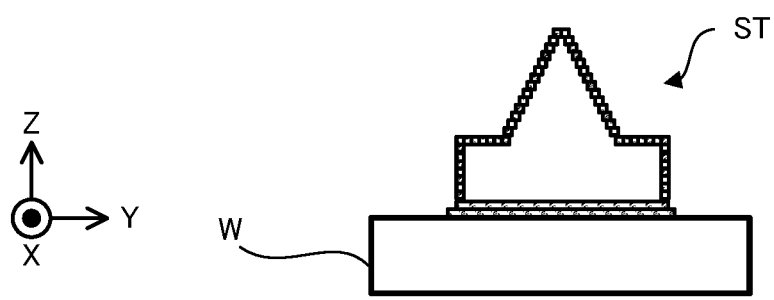

Each of FIG. 12A to FIG. 12C is a cross-sectional view that illustrates a process for forming a three-dimensional structural object.

Figure 13:
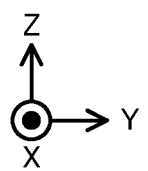
Figure 13:
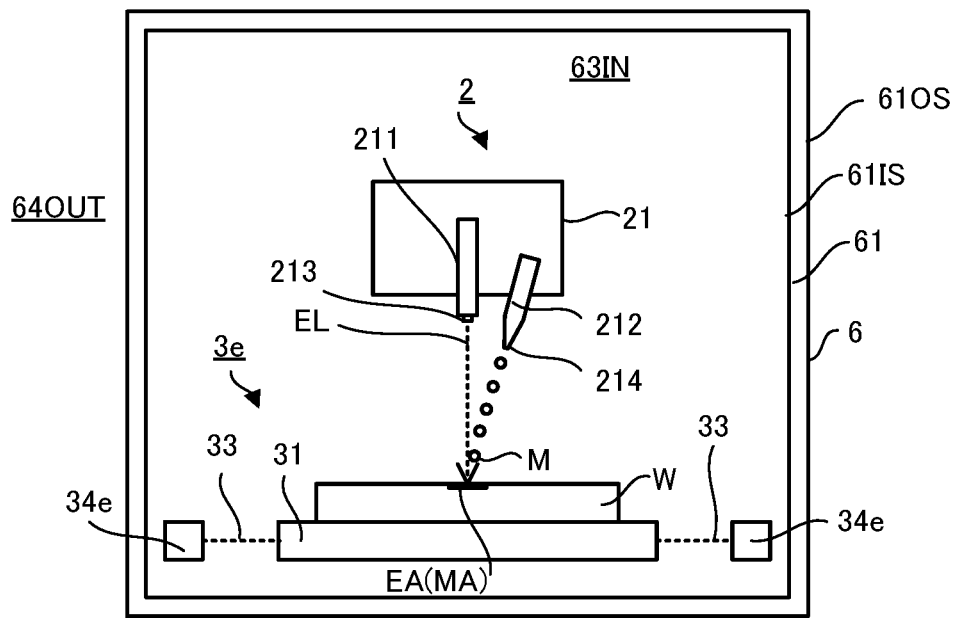

FIG. 13 is a cross-sectional view that illustrates a structure of a processing system in a second embodiment.

Figure 14:
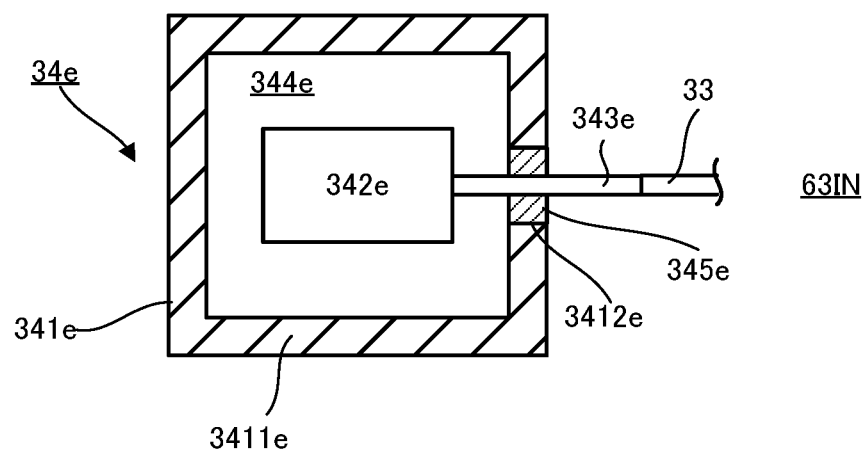

FIG. 14 is a cross-sectional view that illustrates a structure of a driving power source of the processing system in the second embodiment.

Figure 15:
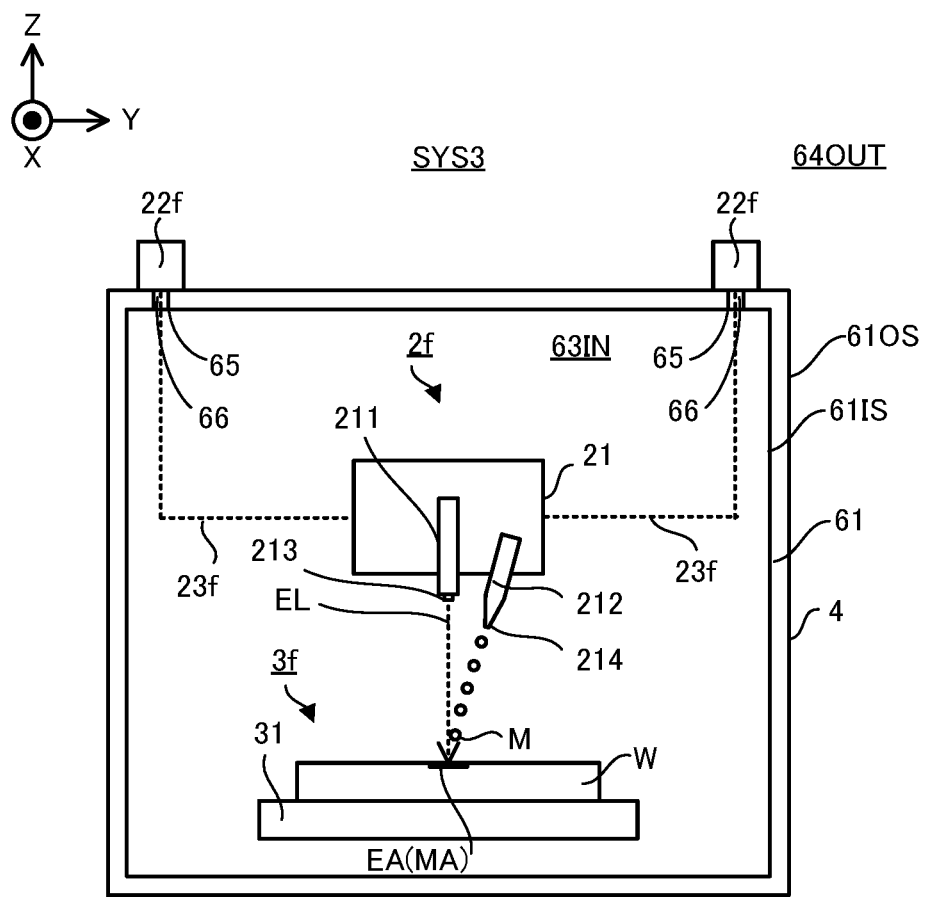

FIG. 15 is a cross-sectional view that illustrates a structure of a processing system in a third embodiment.

Figure 16:
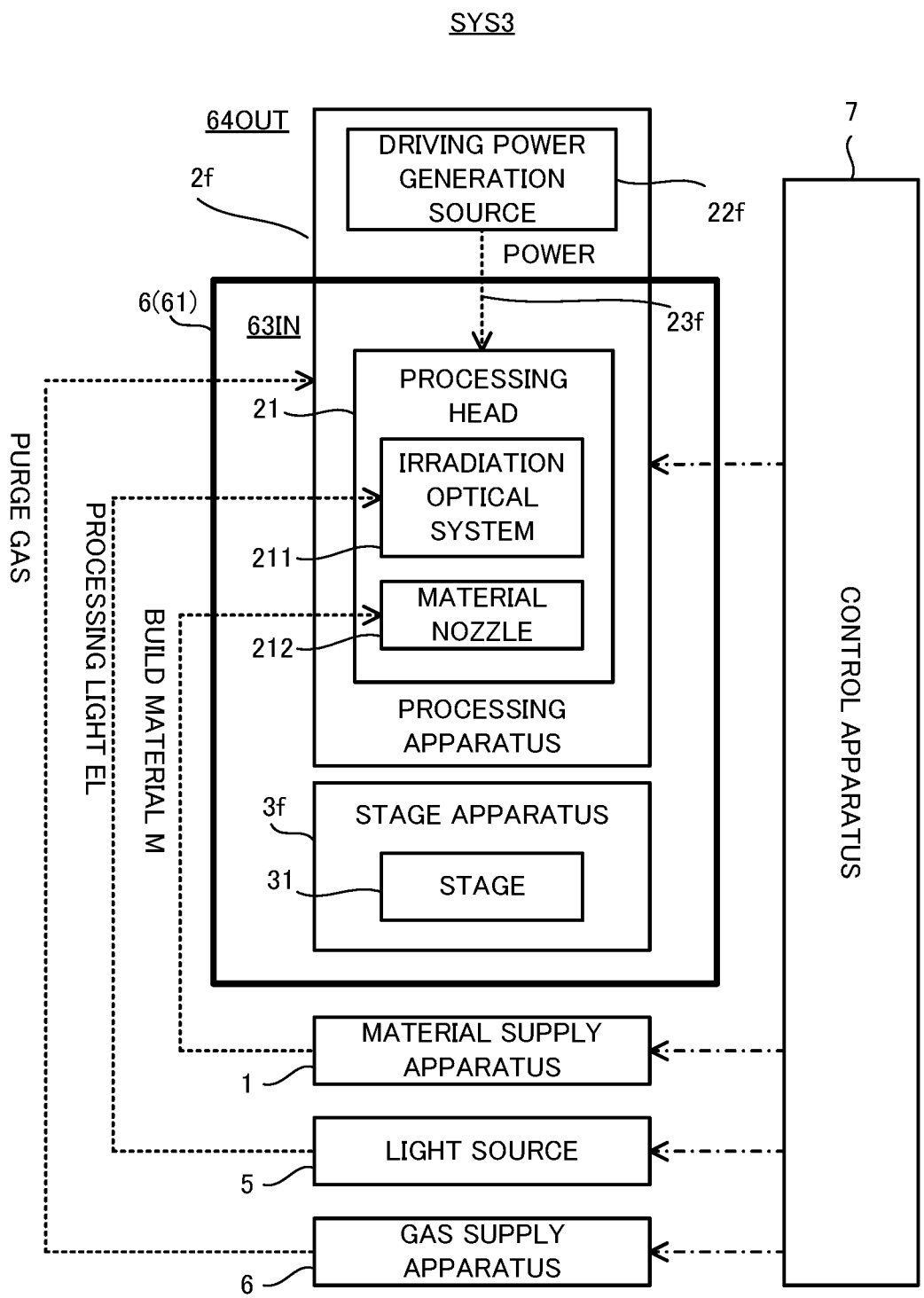

FIG. 16 is a system configuration diagram that illustrates a system configuration of the processing system in the third embodiment.

Figure 17:
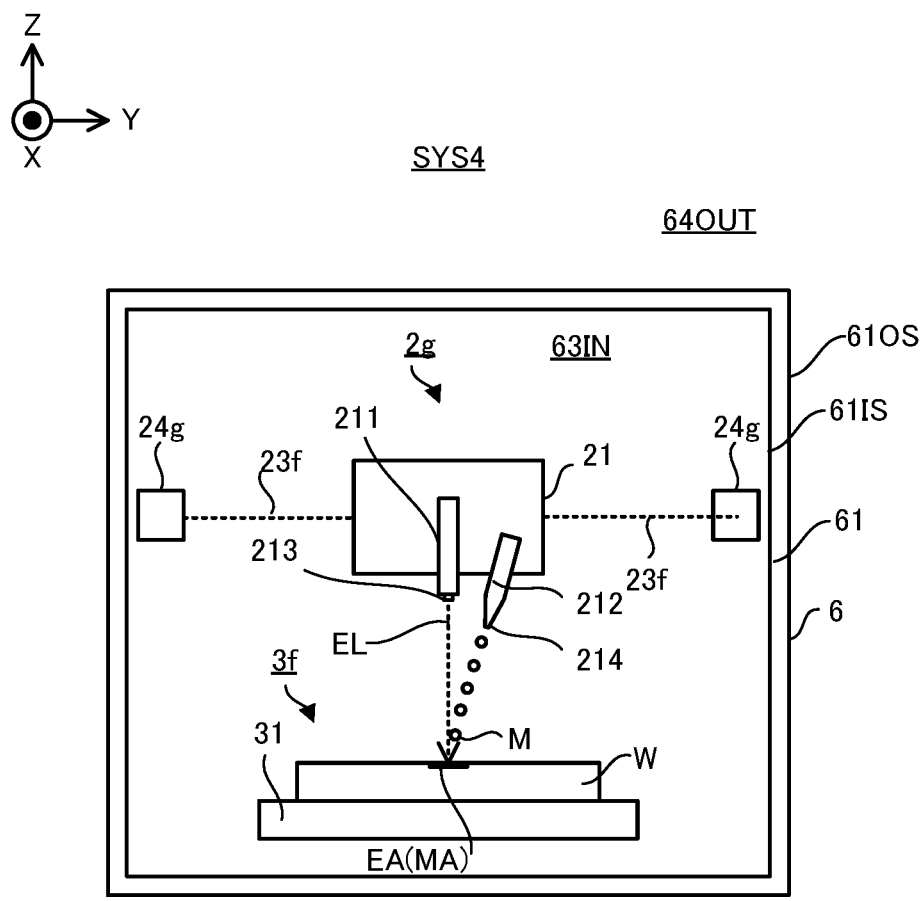

FIG. 17 is a cross-sectional view that illustrates a structure of a processing system in a fourth embodiment.

DESCRIPTION OF EMBODIMENTS

Next, with reference to drawings, embodiments of a processing system will be described. In the below described description, the embodiments of a processing system will be described by using a processing system SYS that is configured to perform an additive processing on a workpiece W that is one example of an object. Especially, in the below described description, the embodiments of a processing system will be described by using a processing system SYS that performs the additive processing based on a LMD (Laser Metal Deposition). The additive processing based on the Laser Metal Deposition is an additive processing for forming a three-dimensional structural object ST that is integrated with the workpiece W or that is separable from the workpiece W by melting build materials M supplied to the workpiece W by a processing light EL. Note that the Laser Metal Deposition may be referred to as a Direct Metal Deposition, a Direct Energy Deposition, a Laser Cladding, a Laser Engineered Net Shaping, a Direct Light Fabrication, a Laser Consolidation, a Shape Deposition Manufacturing, a Wire Feed Laser Deposition, a Gas Through Wire, a Laser Powder Fusion, a Laser Metal Forming, a Selective Laser Powder Re-melting, a Laser Direct Casting, a Laser Powder Deposition, a Laser Additive Manufacturing or a Laser Rapid Forming.

Moreover, in the below described description, a positional relationship of various components that constitute the processing system SYS will be described by using an XYZ rectangular coordinate system that is defined by a X axis, a Y axis and a Z axis that are perpendicular to one another. Note that each of an X axis direction and a Y axis direction is assumed to be a horizontal direction (namely, a predetermined direction in a horizontal plane) and a Z axis direction is assumed to be a vertical direction (namely, a direction that is perpendicular to the horizontal plane, and substantially an up-down direction) in the below described description, for convenience of the description. Moreover, rotational directions (in other words, inclination directions) around the X axis, the Y axis and the Z axis are referred to as a θX direction, a θY direction and a θZ direction, respectively.

Here, the Z axis direction may be a gravity direction. Moreover, an XY plane may be a horizontal direction.

(1) Processing System SYS in First Embodiment

Firstly, the processing system SYS in a first embodiment (in the below description, the processing system SYS in the first embodiment is referred to as a "processing system SYS1") will be described.

(1-1) Structure of Processing System SYS1 in First Embodiment

Figure 1:
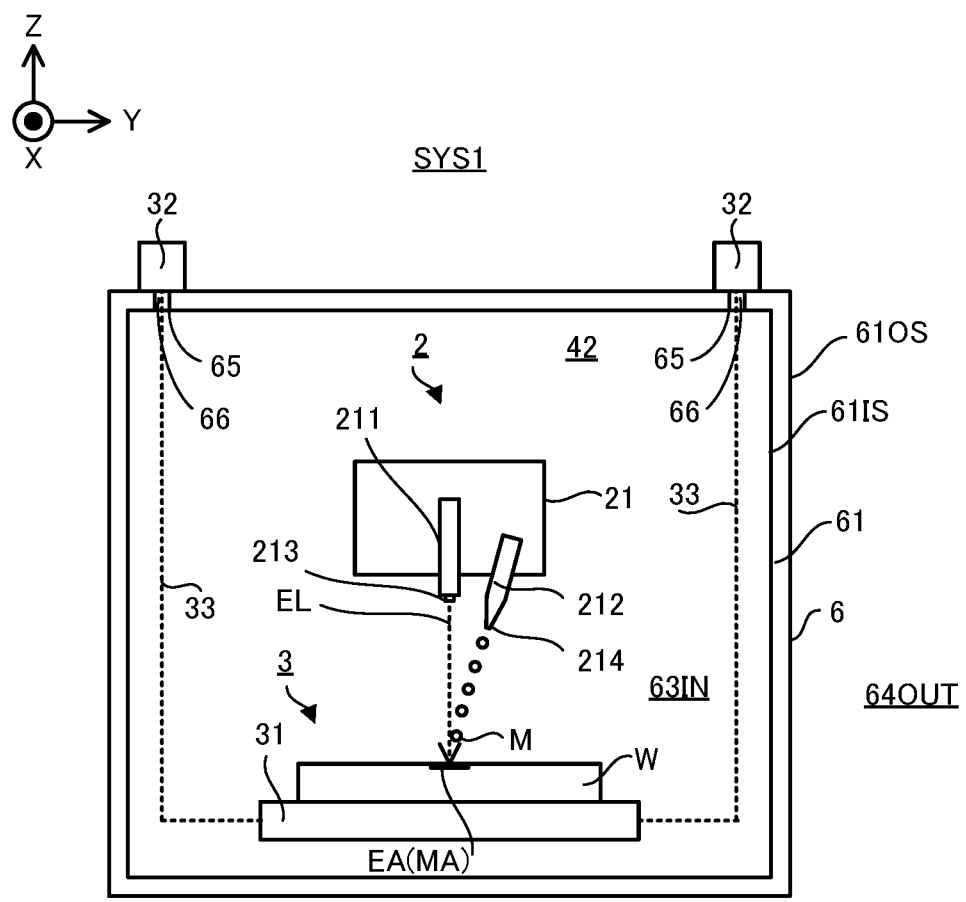
FIG. 1 is a cross-sectional view that illustrates a structure of a processing system in a first embodiment.
Figure 2:
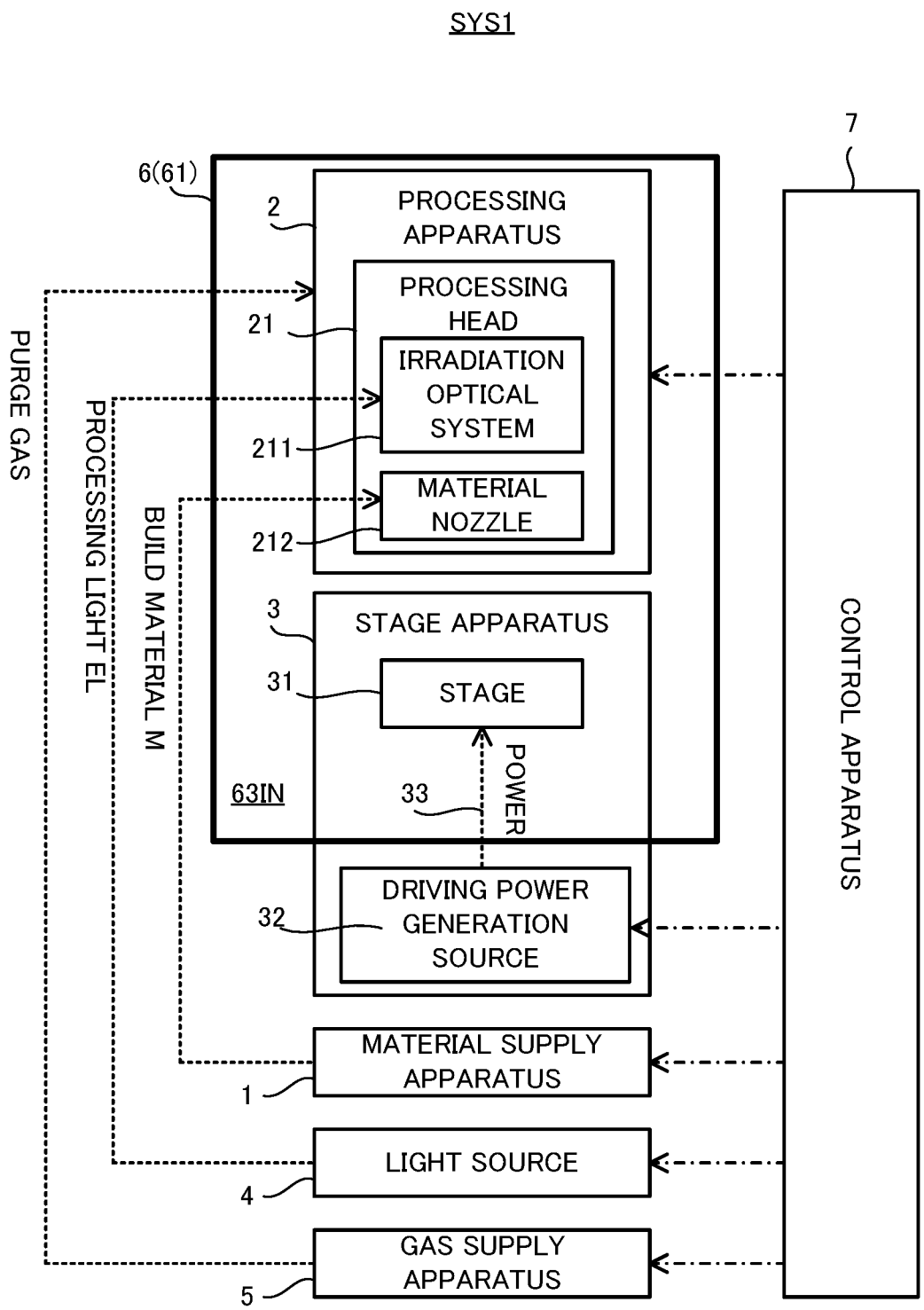
FIG. 2 is a system configuration diagram that illustrates a system configuration of the processing system in the first embodiment.

Firstly, with reference to FIG. 1 and FIG. 2, a structure of the processing system SYS1 in the first embodiment will be described. FIG. 1 is a cross-sectional view that illustrates one example of the structure of the processing system SYS1 in the first embodiment. FIG. 2 is a system configuration diagram that illustrates one example of a system configuration of the processing system SYS1 in the first embodiment.

The processing system SYS1 is configured to form the three-dimensional structural object ST (namely, a three-dimensional object having a size in each of three-dimensional directions, and a solid object). The processing system SYS1 is configured to form the three-dimensional structural object ST on the workpiece W that is a base for forming the three-dimensional structural object ST. The workpiece W may be referred to as a base member or a basement. The processing system SYS1 is configured to form the three-dimensional structural object ST by performing the additive processing on the workpiece W. When the workpiece W is a below described stage 31, the processing system SYS1 is configured to form the three-dimensional structural object ST on the stage 31. When the workpiece W is an existing structural object held by the stage 31 (alternatively, supported by or placed on the stage 31), the processing system SYS1 is configured to form the three-dimensional structural object ST on the existing structural object. In this case, the processing system SYS1 may form the three-dimensional structural object ST that is integrated with the existing structural object. An operation for forming the three-dimensional structural object ST that is integrated with the existing structural object may be regarded to be equivalent to an operation for adding a new structural object to the existing structural object. Note that the existing structural object may be an item that needs to be repaired having a missing part, for example. The processing system SYS1 may form the three-dimensional structural object ST on the item that needs to be repaired to fill in the missing part of the item that needs to be repaired. Alternatively, the processing system SYS1 may form the three-dimensional structural object ST that is separable from the existing structural object. Note that FIG. 1 illustrates an example in which the workpiece W is an existing structural object held by the stage 31. The below described description also uses the example in which the workpiece W is an existing structural object held by the stage 31.

As described above, the processing system SYS1 is configured to form the three-dimensional structural object ST by the Laser Metal Deposition. Namely, it can be said that the processing system SYS1 is a 3D printer that forms an object by using an Additive layer manufacturing technique. Note that the Additive layer manufacturing technique may be referred to as a Rapid Prototyping, a Rapid Manufacturing or an Additive Manufacturing.

In order to form the three-dimensional structural object ST, the processing system SYS1 is provided with a material supply apparatus 1, a processing apparatus 2, a stage apparatus 3, a light source 4, a gas supply apparatus 5, a housing 6 and a control apparatus 7, as illustrated in FIG. 1 and FIG. 2. At least a part of each of the processing apparatus 2 and the stage apparatus 3 is housed in a chamber space 63IN in the housing 6.

The material supply apparatus 1 supplies the build materials M to the processing apparatus 2. The material supply apparatus 1 supplies, to the processing apparatus 2, the build materials M the amount of which is necessary for the processing apparatus 2 to form the three-dimensional structural object ST per unit time by supplying the build materials M at a supply rate based on the necessary amount.

The build material M is a material that is molten by an irradiation of the processing light EL having a predetermined intensity or more intensity. At least one of a metal material and a resin material is usable as the build material M, for example. However, another material that is different from the metal material and the resin material may be used as the build material M. The build materials M are powder-like materials. Namely, the build materials M are powdery materials. The powdery materials may include not only the powder-like materials but also grain-like materials. The build materials M may include the powdery material a particle size of which is within a range of 90 micrometer±40 micrometer, for example. An average particle size of the powdery materials included in the build materials M may be 75 micrometer or another size, for example. However, the build materials M may not be the powdery materials, and wired-like build materials or gas-like build materials may be used, for example. Note that the processing system SYS1 may form build object by processing the build materials M with the energy beam such as a charged particle beam.

The processing apparatus 2 forms the three-dimensional structural object ST by using the build materials M supplied from the material supply apparatus 1. In order to form the three-dimensional structural object ST by using the build materials M, the processing apparatus 2 is provided with a processing head 21. Moreover, the processing head 21 is provided with an irradiation optical system 211 and a material nozzle 212 (namely, a supply system that supplies the build materials M). The processing head 21 is housed in the chamber space 63IN. However, at least a part of the processing head 21 may be disposed in an external space 64OUT that is a space at an outside of the housing 6. Note that the external space 64OUT may be a space which an operator of the processing system SYS1 is allowed to enter.

The irradiation optical system 211 is an optical system (for example, a condensing optical system) for emitting the processing light EL from an emitting part 213. Specifically, the irradiation optical system 211 is optically connected to the light source 4 that generates the processing light EL through a non-illustrated light transmitting member such as an optical fiber and light pipe. The irradiation optical system 211 emits the processing light EL transmitted from the light source 4 through the light transmitting member. The irradiation optical system 211 emits the processing light EL so that the processing light EL propagates in the chamber space 63IN. The irradiation optical system 211 emits the processing light EL in a downward direction (namely, toward a −Z side) from the irradiation optical system 211. The stage 31 is disposed below the irradiation optical system 211. When the workpiece W is supported by or placed on the stage 31, the irradiation optical system 211 emits the processing light EL toward the workpiece W. Specifically, the irradiation optical system 211 is configured to irradiate an irradiation area EA, which is set on the workpiece W as an area that is irradiated with the processing light EL (typically, in which the light is condensed), with the processing light EL. Moreover, a state of the irradiation optical system 211 is switchable between a state where the irradiation area EA is irradiated with the processing light EL and a state where the irradiation area EA is not irradiated with the processing light EL under the control of the control apparatus 7. Note that a direction of the processing light EL emitted from the irradiation optical system 211 is not limited to a direct downward direction (namely, coincident with the −Z axis direction), and may be a direction that is inclined with respect to the Z axis by a predetermined angle, for example.

The material nozzle 212 has a supply outlet 214 that supplies the build materials M. The material nozzle 212 supplies (specifically, injects, blows out or sprays) the build materials M from the supply outlet 214. The material nozzle 212 is physically connected to the material supply apparatus 1 that is a supply source of the build materials M through a non-illustrated pipe and the like. The material nozzle 212 supplies the build materials M supplied from the material supply apparatus 1 through the pipe. The material nozzle 212 may pressure-feed the build materials M supplied from the material supply apparatus 1 through the pipe. Namely, the build materials M from the material supply apparatus 1 and gas (for example, inert gas such as Nitrogen or Argon) for feeding are mixed and pressure-fed to the material nozzle 212 through the pipe. In this case, purge gas supplied from the gas supply apparatus 5 may be used as the gas for feeding, for example. Note that although the material nozzle 212 is illustrated to have a tube-like shape in FIG. 1, the shape of the material nozzle 212 is not limited to this shape. The material nozzle 212 supplies the build materials M toward the chamber space 63IN. The material nozzle 212 supplies the build materials M in a downward direction (namely, toward the −Z side) from the material nozzle 212. The stage 31 is disposed below the material nozzle 212. When the workpiece W is loaded on the stage 31, the material nozzle 212 supplies the build materials M toward the workpiece W. Note that although a moving direction of the build materials M supplied from the material nozzle 212 is a direction that is inclined with respect to the Z axis by a predetermined angle (as one example, an acute angle), it may be the −Z axis direction (namely, a direct downward direction).

In the first embodiment, the material nozzle 212 is aligned to the irradiation optical system 211 so as to supply the build materials M to the irradiation area EA that is irradiated with the processing light EL by the irradiation optical system 211. Namely, the material nozzle 212 is aligned to the irradiation optical system 211 so that the irradiation area EA is coincident with (alternatively, at least partially overlaps with) a supply area MA that is set on the workpiece W as an area to which the material nozzle 212 supplies the build materials M. Note that the material nozzle 212 may be aligned so as to supply the build materials M to a melt pool MP that is formed at the workpiece W by the processing light EL emitted from the irradiation optical system 211.

The stage apparatus 3 is provided with the stage 31. The stage 31 is housed in the chamber space 63IN. The stage 31 is configured to support the workpiece W. Note that a state where "the stage 31 supports the workpiece W" here may mean a state where the workpiece W is directly or indirectly supported by the stage 31. The stage 31 may be configured to hold the workpiece W. Namely, the stage 31 may support the workpiece W by holding the workpiece W. Alternatively, the stage 31 may not be configured to hold the workpiece W. In this case, the workpiece W may be placed on the stage 31. Namely, the stage 31 may support the workpiece W placed on the stage 31. In this case, the workpiece W may be placed on the stage 31 without a clamp. Therefore, the state where "the stage 31 supports the workpiece W" in the present embodiment may include a state where the stage 31 holds the workpiece W and a state where the workpiece W is placed on the stage 31. The stage 31 may be referred to as a support apparatus that supports the workpiece W, a placing apparatus on which the workpiece W is placed or a holding apparatus that holds the workpiece W. Since the stage 31 is housed in the chamber space 63IN, the workpiece W supported by the stage 31 is also housed in the chamber space 63IN. Moreover, the stage 31 may be configured to release the held workpiece W, when the workpiece W is held. The above described irradiation optical system 211 emits the processing light EL in at least a part of a period when the stage 31 supports the workpiece W. Moreover, the above described material nozzle 212 supplies the build materials M in at least a part of the period when the stage 31 supports the workpiece W. Note that there is a possibility that a part of the build materials M supplied by the material nozzle 212 is scattered or falls to the outside of the workpiece W (for example, around the stage 31) from a surface of the workpiece W. Thus, the processing system SYS1 may be provided with a recovery apparatus that recovers the build material M scattered or falling around the stage 31. Note that the stage 31 may be provided with a mechanical chuck, a vacuum chuck and the like in order to hold the workpiece W.

The stage apparatus 3 is further provided with a driving power source 32 and a driving power transmission member 33. The driving power source 32 and the driving power transmission member 33 constitute a stage driving system for moving the stage 31 in the chamber space 63IN.

The driving power source 32 is an apparatus that generates a driving power for moving the stage 31 (namely, a driving power generation apparatus). Specifically, the driving power source 32 electrically generates the driving power. Namely, the driving power source 32 generates the driving power by using electrical current supplied form a non-illustrated electric power source. In other words, the driving power source 32 generates the driving power by converting the electrical current supplied form the non-illustrated electric power source into the driving power. Electrically generates the driving power. An actuator such as a motor is one example of the driving power source 32. In this case, the driving power source 32 includes a part that is possibly an ignition source (in the below described description, the part that is possibly the ignition source is simply referred to as the "ignition source" for the simple description). A conduction part (for example, a coil) to which the electrical current is supplied is one example of the ignition source. This is because an electric part generates at the conduction part and/or the conduction part generates heat when the conduction part is supplied to the coil.

The driving power transmission member 33 is an apparatus that transmits the driving power generated by the driving power source 32 to the stage 31. As a result, the stage 31 moves by the driving power that is transmitted from the driving power source 32 through the driving power transmission member 33. Especially in the first embodiment, the driving power transmission member 33 non-electrically transmits the driving power generated by the driving power source 32 to the stage 31. For example, the driving power transmission member 33 may mechanically transmit the driving power generated by the driving power source 32 to the stage 31. For example, the driving power transmission member 33 may transmit the driving power generated by the driving power source 32 to the stage 31 by mechanically connecting the driving power source 32 to the stage 31. In this case, the driving power transmission member 33 does not have the ignition source unlike the driving power source 32. In order to mechanically transmit the driving power, the driving power transmission member 33 may be provided with a member that is configured to mechanically transmit the driving power. At least one of a screw (for example, at least one of a trapezoidal screw, a ball screw, a sliding screw and a triangular screw), a gear (for example, at least one of a spur gear, an internal gear that engages with an external gear, a worm gear that engages with a worm, a bevel gear, a rack and pinion, a screw gear and a helical gear), a belt (for example, at least one of a flat belt, a round belt and a toothed belt), a pulley, a wire rope, a chain, a shaft and a purchase is one example of the member that is configured to mechanically transmit the driving power. The driving power transmission member 33 forms a driving power transmission path that extends from the driving power source 32 to the stage 31 by using at least one of these members. Specifically, the driving power transmission member 33 extends from the driving power source 32 to the stage 31, because the driving power transmission source 33 itself is the driving power transmission path.

Note that FIG. 1 illustrates an example in which the processing system SYS1 is provided with a plurality of (two in the example illustrated in FIG. 1) driving power sources 32, however, the processing system SYS1 may be provided with a single driving power source 32. Similarly, FIG. 1 illustrates an example in which the processing system SYS1 is provided with a plurality of (two in the example illustrated in FIG. 1) driving power transmission members 33, however, the processing system SYS1 may be provided with a single driving power transmission member 33.

When the stage 31 moves, a relative position of the stage 31 and the processing apparatus 2 (especially, the processing head 21) is changed. Thus, the stage driving system that is constituted by the driving power source 32 and the driving power transmission member 33 is configured to serve as an apparatus for changing the relative position of the stage 31 and the processing apparatus 2 (especially, the processing head 21).

The stage driving system may move the stage 31 along at least one of the X axis, the Y axis and the Z axis. When the stage 31 moves along at least one of the X axis, the Y axis and the Z axis, the relative position of the stage 31 and the processing apparatus 2 (especially, the processing head 21) is changed. Thus, the stage driving system that is constituted by the driving power source 32 and the driving power transmission member 33 is configured to serve as an apparatus for changing the relative position of the stage 31 and the processing apparatus 2 (especially, the processing head 21). Incidentally, when the stage 31 moves along at least one of the X axis and the Y axis, the irradiation area EA moves on the workpiece W along at least one of the X axis and the Y axis.

The stage driving system may move the stage 31 along a rotational direction that includes at least one of the OX direction, the OY direction and the OZ direction, in addition to or instead of at least one of the X axis, the Y axis and the Z axis. In other words, the stage driving system may rotate the stage 31 around at least one axis of the X axis, the Y axis and the Z axis. The stage driving system may change an attitude of the stage 31 around at least one axis of the X axis, the Y axis and the Z axis. When the stage 31 along a rotational direction that includes at least one of the OX direction, the OY direction and the OZ direction, a relative attitude of the stage 31 and the processing apparatus 2 (especially, the processing head 21) is changed. Thus, the stage driving system that is constituted by the driving power source 32 and the driving power transmission member 33 is configured to serve as an apparatus for changing the relative attitude of the stage 31 and the processing apparatus 2 (especially, the processing head 21).

The light source 4 emits, as the processing light EL, at least one of an infrared light and an ultraviolet light, for example. However, light having another wavelength, for example, a light in a visible range may be used as the processing light EL. The processing light EL is a laser light. In this case, the light source 4 may include a laser light source such as a semiconductor laser. At least one of a Laser Diode (LD)), a fiber laser, a $CO_2$ laser, a YAG laser, an Excimer laser and the like is one example of the laser light source. However, the processing light EL may not be the laser light and the light source 4 may include any light source (for example, at least one of a LED (Light Emitting Diode), a discharge lamp and the like).

The gas supply apparatus 5 is a supply source of the purge gas for purging the chamber 63IN. The purge gas is a gas that does not include an oxygen gas (alternatively, includes only very small amount of oxygen gas even when including it). The purge gas includes inert gas. The Nitrogen gas or Argon gas is one example of the inert gas. The gas supply apparatus 5 supplies the purge gas to the chamber space 63IN. As a result, the chamber space 63IN is a space that is purged by the purge gas. Note that the gas supply apparatus 5 may be a tank that stores the inert gas such as the Nitrogen gas or the Argon gas. When the purge gas is the Nitrogen gas, the gas supply apparatus 5 may be a Nitrogen gas generation apparatus that generates the Nitrogen gas by using air as material.

The gas supply apparatus 5 may supply the purge gas to the chamber space 63IN so that an oxygen concentration in the chamber space 63IN is equal to or lower than a predetermined concentration. The predetermined concentration may be a fixed value (alternatively, a variable value) that is set for the processing system SYS1. In this case, the predetermined concentration may be set to an oxygen concentration that prevents an explosion (typically, a dust explosion) caused by a contact between the build materials M in the chamber space 63IN and the ignition source of the driving power source 32. For example, the predetermined concentration may be set to 0.5%.

The gas supply apparatus 5 may supply the purge gas to the chamber space 63IN so that the oxygen concentration in the chamber space 63IN is lower than an oxygen concentration in the external space 64OUT. Namely, the gas supply apparatus 5 may supply the purge gas to the chamber space 63IN so that the oxygen concentration in the external space 64OUT is higher than the oxygen concentration in the chamber space 63IN.

The gas supply apparatus 5 may supply the purge gas to the chamber space 63IN so that a pressure in the chamber space 63IN is higher than a pressure in a space (for example, the external space 64OUT) other than the chamber space 63IN. Namely, the gas supply apparatus 5 may supply the purge gas to the chamber space 63IN so that the pressure in the space (for example, the external space 64OUT) other than the chamber space 63IN is lower than the pressure in the chamber space 63IN.

The housing 6 is a housing apparatus that houses at least a part of each of at least the processing apparatus 2 and the stage apparatus 3 in the chamber space 63IN that is an internal space of the housing 6. The housing 6 is provided with a partition member 61 that forms the chamber space 63IN. The partition member 61 is a member that separates (namely, isolates) the chamber space 63IN from the external space 64OUT at the outside of the housing 6. The partition member 61 may be referred to as a wall member. The partition member 61 is a member that is disposed between the chamber space 63IN and the external space 64OUT. The partition member 61 faces the chamber space 63IN through its inner wall 61IS and faces the external space 64OUT through its outer wall 61OS. In this case, a space surrounded by the partition member 61 (more specifically, a space surrounded by the inner wall 61IS of the partition member 61) is the chamber space 63IN. Note that an openable and closable door may be disposed at the partition member 61. The door may be opened when the workpiece W is to be supported by the stage 31 and the workpiece W and/or a build object (alternatively, the three-dimensional structural object ST) is unloaded from the stage 31 and may be closed when the build is performed.

The driving power source 32 is disposed in the external space 64OUT. Namely, the driving power source 32 is not disposed in the chamber space 63IN. The driving power source 32 is separated from the chamber space 63IN by the partition member 61. The driving power source 32 is disposed at a portion that is separated from the chamber space 63IN by the partition member 61. In this case, the partition member 61 is a member that separates the driving power source 32 from the chamber space 63IN by surrounding the chamber space 63IN.

When the driving power source 32 is disposed in the external space 64OUT, the ignition source (for example, the above described conduction part) of the driving power source 32 is also disposed in the external space 64OUT. Namely, the ignition source of the driving power source 32 is not disposed in the chamber space 63IN. The ignition source of the driving power source 32 is separated from the chamber space 63IN by the partition member 61. The ignition source of the driving power source 32 is disposed at a position that is separated from the chamber space 63IN by the partition member 61. In this case, the partition member 61 is allowed to serve as a member that separates the ignition source of the driving power source 32 from the chamber space 63IN (namely, separates the chamber space 63IN from the ignition source of the driving power source 32) by surrounding the chamber space 63IN. Moreover, the partition member 61 prevents the build materials M supplied to the chamber space 63IN from being leaked to the external space 64OUT by surrounding the chamber space 63IN.

As a result, it is possible to prevent the build materials M (especially, the build materials M that are the powdery materials) supplied to the chamber space 63IN from contacting with the ignition source of the driving power source 32 that is disposed in the external space 64OUT. Note that "the contact between the build materials M and the ignition source" includes not only "a contact between the build materials M and the ignition source itself" but also "a contact between the build materials and the electric spark and the like that is generated at the ignition source". Thus, it is possible to prevent the explosion (typically, the dust explosion) caused by the contact between the build materials M in the chamber space 63IN and the ignition source of the driving power source 32.

In this case, the housing 6 may have an explosion proof structure that prevents the explosion caused by the contact between the build materials M in the chamber space 63IN and the ignition source of the driving power source 32. For example, the housing 6 may have an intrinsic safety explosion proof structure that prevents the explosion of the build materials M caused by the electric spark or a high temperature part generated at the ignition source of the driving power source 32. For example, the housing 6 may have an increased safety explosion proof structure that increases a structural safety so that the electric spark or the high temperature part is not generated in the chamber space 63IN in which the electric spark or the high temperature part should not be generated.

However, the driving power that is generated by the driving power source 32 in the external space 64OUT needs to be transmitted to the stage 31 that is disposed in the chamber space 63IN. Thus, the driving power transmission member 33 transmits the driving power that is generated by the driving power source 32 in the external space 64OUT to the stage 31 that is disposed in the chamber space 63IN. Namely, the driving power transmission member 33 transmits the driving power from the external space 64OUT to the chamber space 63IN. In this case, at least a part of the driving power transmission member 33 is disposed in the chamber space 63IN. Even when at least a part of the driving power transmission member 33 is disposed in the chamber space 63IN, the fact remains that the explosion in the chamber space 63IN is prevented, because the driving power transmission member 33 does not have the ignition source as described above.

In order to transmit the driving power from the external space 64OUT to the chamber space 63IN, an aperture 65 is formed at the partition member 61. The aperture 65 is a through hole that penetrates the partition member 61 from the external space 64OUT to the chamber space 63IN. A part of the driving power transmission member 33 is disposed in the aperture 65. Namely, the driving power transmission member 33 extends from the external space 64OUT to the chamber space 63IN through the aperture 65. As a result, the driving power transmission member 33 is allowed to transmit the driving power from the external space 64OUT to the chamber space 63IN through the aperture 65. Namely, the driving power that is generated by the driving power source 32 in the external space 64OUT is transmitted to the stage 31 that is disposed in the chamber space 63IN through the aperture 65.

When the aperture 65 is formed at the partition member 61, the chamber space 63IN is connected to the external space 64OUT through the aperture 65. Thus, when a gap (especially, a relatively large gap) exists between a wall surface of the partition member 61 that forms the aperture 65 and the driving power transmission member 33 that is disposed in the aperture 65, there is a possibility that the build materials M in the chamber space 63IN contact with the ignition source of the driving power source 32 through the aperture 65. Thus, the aperture 65 may be sealed by a seal member 66. The seal member 66 is a member that seals between the wall surface of the partition member 61 that forms the aperture 65 and the driving power transmission member 33 that is disposed in the aperture 65. Specifically, the seal member 66 is a member that fills in the gap between the wall surface of the partition member 61 that forms the aperture 65 and the driving power transmission member 33 that is disposed in the aperture 65. Note that "filling in the gap between the wall surface of the partition member 61 and the driving power transmission member 33" may mean completely eliminating (namely, filling in) the gap between the wall surface of the partition member 61 and the driving power transmission member 33, and may mean reducing the gap between the wall surface of the partition member 61 and the driving power transmission member 33 to the extent that the chamber space 63IN is sealed. Namely, the seal member 66 may serve as a member that seal the chamber space 63IN (namely, keeps an airtightness of the chamber space 63IN). More specifically, the seal member 66 seals the chamber space 63IN in cooperation with the partition member 61 and the driving power transmission member 33. Note that at least one of a gum seal, an oil seal and a labyrinth seal is one example of the seal member 66.

When the aperture 65 is sealed by the seal member 66, it is possible to prevent the build materials M in the chamber space 63IN from contacting with the ignition source of the driving power source 32 through the aperture 65. Namely, the seal member 66 may serve as a member that prevents the build materials M in the chamber space 63IN from contacting with the ignition source of the driving power source 32 through the aperture 65. Specifically, for example, the seal member 66 may serve as a member that prevents the electric spark generated by the driving power source 32 in the external space 64OUT from entering the chamber space 63IN, to which the build materials M are supplied, through the aperture 65 in cooperation with the partition member 61 and the driving power transmission member 33. For example, the seal member 66 may serve as a member that prevents the build materials M that are supplied to the chamber space 63IN from entering the external space 64OUT, in which the driving power source 32 including the ignition source is disposed, through the aperture 65 in cooperation with the partition member 61 and the driving power transmission member 33.

The control apparatus 7 controls an operation of the processing system SYS1. The control apparatus 7 may include a CPU (Central Processing Unit) (alternatively, a GPU (Graphic Processing Unit) in addition to or instead of the CPU) and a memory, for example. The control apparatus 7 serves as an apparatus for controlling the operation of the processing system SYS1 by means of the CPU executing a computer program. The computer program is a computer program that allows the control apparatus 7 (for example, the CPU) to execute (namely, to perform) a below described operation that should be executed by the control apparatus 7. Namely, the computer program is a computer program that allows the control apparatus 7 to function so as to make the processing system SYS1 execute the below described operation. The computer program executed by the CPU may be recorded in the memory (namely, a recording medium) of the control apparatus 7, or may be recorded in any recording medium (for example, a hard disk or a semiconductor memory) that is built in the control apparatus 7 or that is attachable to the control apparatus 7. Alternatively, the CPU may download the computer program that should be executed from an apparatus disposed at the outside of the control apparatus 7 through a network interface.

For example, the control apparatus 7 may control an emitting aspect of the processing light EL by the irradiation optical system 211. The emitting aspect may include at least one of an intensity of the processing light EL and an emitting timing of the processing light EL, for example. When the processing light EL is a pulse light, the emitting aspect may include a ratio (what we call a duty ratio) of the ON time of the pulse light and an emission cycle of the pulse light, for example. Moreover, the emission aspect may include the length of the ON time of the pulse light itself and an emission cycle itself, for example. Moreover, the control apparatus 7 may control a moving aspect of the stage 31 by the driving power source 32. The moving aspect may include at least one of a moving distance, a moving speed, a moving direction and a moving timing, for example. Moreover, the control apparatus 7 may controls a supply aspect of the build materials M by the material supply apparatus 1. A supply aspect of the build materials M by the material nozzle 212 is mainly determined by the supply aspect of the build materials M by the material supply apparatus 1. Thus, controlling the supply aspect of the build materials M by the material supply apparatus 1 may be regarded to be equivalent to controlling the supply aspect of the build materials M by the material nozzle 212. The supply aspect may include at least one of the supplied amount (especially, the supplied amount per unit time) and a supply timing.

The control apparatus 7 may not be disposed in the processing system SYS1, and may be disposed at the outside of the processing system SYS1 as a server or the like. In this case, the control apparatus 7 may be connected to the processing system SYS1 through a wired and/or wireless network (alternatively, a data bus and/or a communication line). A network using a serial-bus-type interface such as at least one of IEEE1394, RS-232x, RS-422, RS-423, RS-485 and USB may be used as the wired network. A network using a parallel-bus-type interface may be used as the wired network. A network using an interface that is compatible to Ethernet (registered trademark) such as at least one of 10-BASE-T, 100BASE-TX or 1000BASE-T may be used as the wired network. A network using an electrical wave may be used as the wireless network. A network that is compatible to IEEE802.1x (for example, at least one of a wireless LAN and Bluetooth (registered trademark)) is one example of the network using the electrical wave. A network using an infrared ray may be used as the wireless network. A network using an optical communication may be used as the wireless network. In this case, the control apparatus 7 and the processing system SYS1 may be configured to transmit and receive various information through the network. Moreover, the control apparatus 7 may be configured to transmit an information such as a command and a control parameter to the processing system SYS1 through the network. The processing system SYS1 may be provided with a receiving apparatus that receives the information such as the command and the control parameter from the control apparatus 7 through the network.

Note that a part of the control apparatus 7 may be disposed in the processing system SYS1 and another part thereof may be disposed at the outside of the processing system SYS1.

Note that the recording medium recording therein the computer program that should be executed by the CPU may include an optical disc such as a CD-ROM, a CD-R, a CD-RW, a flexible disc, a MO, a DVD-ROM, a DVD-RAM, a DVD-R, a DVD+R, a DVD-RW, a DVD+RW and a Blu-ray (registered trademark), a magnetic disc such as a magnetic tape, an optical-magnetic disc, a semiconductor memory such as a USB memory, and another medium that is configured to store the program. Moreover, the recording medium may include a device that is configured to record the computer program (for example, a device for an universal use or a device for an exclusive use in which the computer program is embedded to be executable in a form of at least one of a software, a firmware and the like). Moreover, various processes or functions included in the computer program may be realized by a logical process block that is realized in the control apparatus 7 by means of the control apparatus 7 (namely, a computer) executing the computer program, may be realized by a hardware such as a predetermined gate array (a FPGA, an ASIC) of the control apparatus 7, or may be realized in a form in which the logical process block and a partial hardware module that realizes an partial element of the hardware are combined.

(1-2) Specific Example of Stage Apparatus 3

Next, a specific example of the stage apparatus 3 in which the driving power source 32 is disposed in the external space 64OUT. In the first embodiment, the processing system SYS1 may use at least one of a first stage apparatus 3a, a second stage apparatus 3b, a third stage apparatus 3c and a fourth stage apparatus 3d. Thus, the first stage apparatus 3a to the fourth stage apparatus 3d will be described in sequence next. Note that first stage apparatus 3a to the fourth stage apparatus 3d are merely examples. Namely, the processing system SYS1 may be provided with the stage apparatus 3 that has a structure different from those of the first stage apparatus 3a to the fourth stage apparatus 3d.

(1-2-1) Structure of First Stage Apparatus 3a

Figure 3:
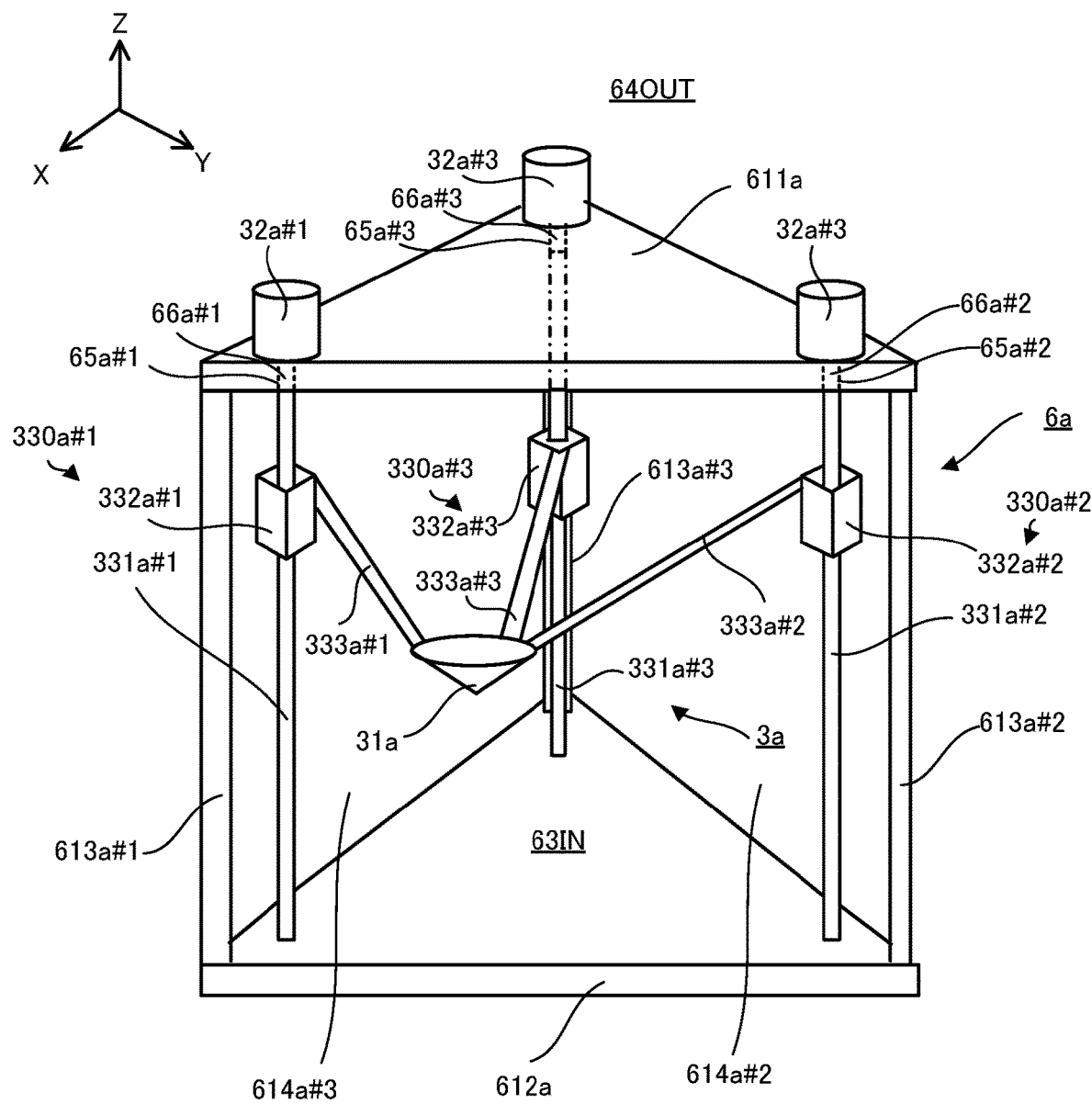
FIG. 3 is a perspective view that illustrates a structure of a first stage apparatus in which an illustration of a part of a partition member is omitted.
Figure 4:
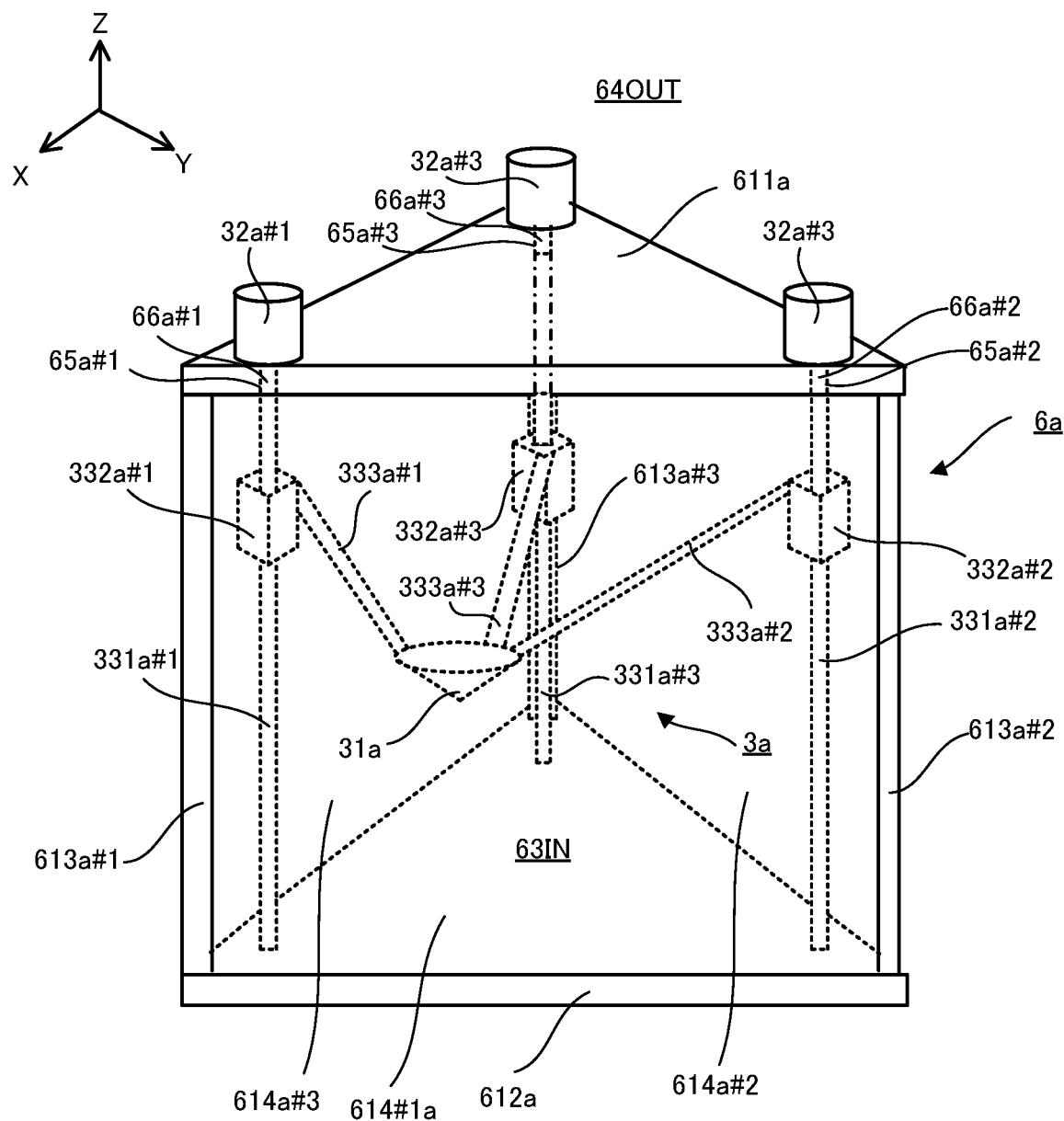
FIG. 4 is a perspective view that illustrates the structure of the first stage apparatus in which the illustration of a part of the partition member is not omitted.

Firstly, with reference to FIG. 3 and FIG. 4, a structure of the first stage apparatus 3a will be described. FIG. 3 is a perspective view that illustrates the structure of the first stage apparatus 3a in which an illustration of a part of a partition member 61a is omitted. FIG. 4 is a perspective view that illustrates the structure of the first stage apparatus 3a in which the illustration of a part of the partition member 61a is not omitted.

As illustrated in FIG. 3 and FIG. 4, the first stage apparatus 3a is provided with a stage 31a that is one example of the stage 31. The first stage apparatus 3a is further provided with three motors 32a (specifically, a motor 32a #1, a motor 32a #2 and a motor 32a #3) each of which is one example of the driving power source 32. The first stage apparatus 3a is further provided with three driving power transmission member 33a (specifically, a driving power transmission member 33a #1, a driving power transmission member 33a #2 and a driving power transmission member 33a #3) each of which is one example of the driving power transmission member 33. The driving power transmission members 33a #1 to 33a #3 transmit, to the stage 31a, the driving powers that are generated by the motor 32a #1 to 32a #3, respectively.

The driving power transmission member 33a #1 is provided with a ball screw (alternatively, a sliding screw, the same applies to the below described description) 330a #1 and a connection member 333a #1. The ball screw 330a #1 is provided with an axial member 331a #1 and a nut 332a #1. The driving power transmission member 33a #2 is provided with a ball screw 330a #2 and a connection member 333a #2. The ball screw 330a #2 is provided with an axial member 331a #2 and a nut 332a #2. The driving power transmission member 33a #3 is provided with a ball screw 330a #3 and a connection member 333a #3. The ball screw 330a #3 is provided with an axial member 331a #3 and a nut 332a #3.

Each of the axial members 331a #1 to 331a #3 is a screw axis on a side surface of which a screw thread is formed. Each of the axial members 331a #1 to 331a #3 is disposed to extend along the Z axis direction. The axial members 331a #1 to 331a #3 are connected to rotational axes of the motor 32a #1 to 32a #3, respectively. The axial members 331a #1 to 331a #3 are rotated around the Z axis direction by the motor 32a #1 to 32a #3, respectively. As a result, the nuts 332a #1 to 332a #3, which engage the axial members 331a #1 to 331a #3, respectively, move along the Z axis direction. Thus, the axial members 331a #1 to 331a #3 transmit the driving powers that are generated by the motor 32a #1 to 32a #3 along the Z axis direction, respectively. The axial members 331a #1 to 331a #3 are disposed at or near vertices of an area having a triangular (typically, an equilateral triangular) shape in a plane along an XY plane, respectively. Thus, the motors 32a #1 to 32a #3 are also disposed at or near vertices of an area having a triangular (typically, an equilateral triangular) shape in a plane along an XY plane, respectively.

One end of the connection members 333a #1 to 333a #3 is connected to respective one of the nuts 332a #1 to 332a #3. The other end of each of the connection members 33a #1 to 333a #3 is connected to the stage 31a. One end of the connection members 333a #1 to 333a #3 also moves along the Z axis direction along with the movement of respective one of the nuts 332a #1 to 332a #3 along the Z axis direction. As a result, the other end of the connection members 333a #1 to 333a #3 move along at least one of the X axis, the Y axis and the Z axis along with the movement of one end of respective one of the connection members 333a #1 to 333a #3. As a result, the stage 31a move s along at least one of the X axis, the Y axis, the Z axis, the OX direction, the OY direction and the OZ direction. The processing system SYS1 that is provided with the driving power transmission members 33a #1 to 33a #3 described above is referred to as a delta-type of 3D printer.

When the processing system SYS1 is provided with the first stage apparatus 3a, the processing system SYS1 is provided with, as the housing 6, a housing 6a matching the first stage apparatus 3a. Specifically, the housing 6a is provided with a ceiling member 611a, a bottom member 612a, a pole member 613a #1, a pole member 613a #2, a pole member 613a #3, a side wall member 614a #1, a side wall member 614a #2 and a side wall member 614a #3 each of which constitutes a part of the partition member 61. The ceiling member 611a is a member that forms an upper (namely, the +Z side) border of the chamber space 63IN. The ceiling member 611a is a plate-shaped member along the XY plane, for example. The bottom member 612a is a member that forms a lower (namely, the −Z side) border of the chamber space 63IN. The bottom member 612a is disposed under the ceiling member 611a. The bottom member 612a is a plate-shaped member along the XY plane, for example. Each of the pole members 613a #1 to 613a #3 is a column shaped member that extends from the bottom member 612a to the ceiling member 611a. Namely, each of the pole members 613a #1 to 613a #3 is a column shaped member that extends along the Z axis direction. Each of the side wall members 614a #1 to 614a #3 is a member that forms a lateral border of the chamber space 63IN. Each of the side wall members 614a #1 to 614a #3 is a plate-shaped member that extends along the Z axis. The side wall member 614a #1 is disposed to block an opening among the ceiling member 611a, the bottom member 612a, the pole member 613a #1 and the pole member 613a #2. However, an illustration of the side wall member 614a #1 is omitted in FIG. 3. The side wall member 614a #2 is disposed to block an opening among the ceiling member 611a, the bottom member 612a, the pole member 613a #2 and the pole member 613a #3. The side wall member 614a #3 is disposed to block an opening among the ceiling member 611a, the bottom member 612a, the pole member 613a #3 and the pole member 613a #1. As a result, a space that is surrounded by the ceiling member 611a, the bottom member 612a, the side wall member 614a #1, the side wall member 614a #2 and the side wall member 614a #3 is formed as the chamber space 63IN. Note that a gap between the ceiling member 611a, the bottom member 612a, the pole member 613a #2, the pole member 613a #3, the side wall member 614a #1, the side wall member 614a #2 and the side wall member 614a #3 may be sealed by a seal member in order to keep the airtightness of the chamber space 63IN (as a result, to prevent the spark from the motors 32a from entering the chamber space 63IN).

The driving power transmission members 33a #1 to 33a #3 are disposed in the chamber space 63IN. On the other hand, the motors 32a #1 to 32a #3 are disposed in the external space 64OUT. However, the axial members 331a #1 to 331a #3 extend from the chamber space 63IN to the rotational axes of the motors 32a #1 to 32a #3 through apertures 65a #1 to 65a #3 formed at the ceiling member 611a, respectively. Each of the apertures 65a #1 to 65a #3 is a through hole that extends along the Z axis direction to penetrate the ceiling member 611a along the Z axis direction (namely, penetrates the ceiling member 611a along a direction that intersects with a surface of the plate-shaped ceiling member 611a). Thus, a part of each of the axial members 331a #1 to 331a #3 is disposed in the external space 64OUT. However, when the rotational axes of the motors 32a #1 to 32a #3 extend from the chamber space 63IN to the external space 64OUT through the aperture 65a #1 to 65a #3, respectively, each of the axial members 331a #1 to 331a #3 may not be disposed in the external space 64OUT.

The ceiling member 611a has a triangular shape (typically, an equilateral triangular shape) in a plane along the XY plane. Moreover, the bottom member 612a, which faces the ceiling member 611a along the Z axis direction, also has a triangular shape (typically, an equilateral triangular shape) in a plane along the XY plane. The motors 32a #1 to 32a #3 are disposed at three vertices of the triangular shape of the ceiling member 611a or near the three vertices, respectively. The apertures 65a #1 to 65a #3, each of which is one example of the aperture 65, are formed at three vertices of the triangular shape of the ceiling member 611a or near the three vertices, respectively. The apertures 65a #1 to 65a #3 are sealed by seal members 66a #1 to 66a #3 each of which is one example of the seal member 66, respectively. Here, distances between the axial members 311a #1 to 311a #3 and the aperture 65a #1 to 65a #3 do not change even when the axial members 311a #1 to 311a #3 of the driving power transmission members 33a #1 to 33a #3 rotate, and thus, an imperfection of sealing by the seal members 66a #1 to 66a #3 is less likely to be caused. Note that the ceiling member 611a may have a shape other than the triangular shape. For example, it has a rectangular shape, a polygonal shape or a circular shape. In this case, a shape of the chamber space 63IN may be a quadrangular prism, a polygonal prism or a column.

(1-2-2) Structure of Second Stage Apparatus 3b

Figure 5:
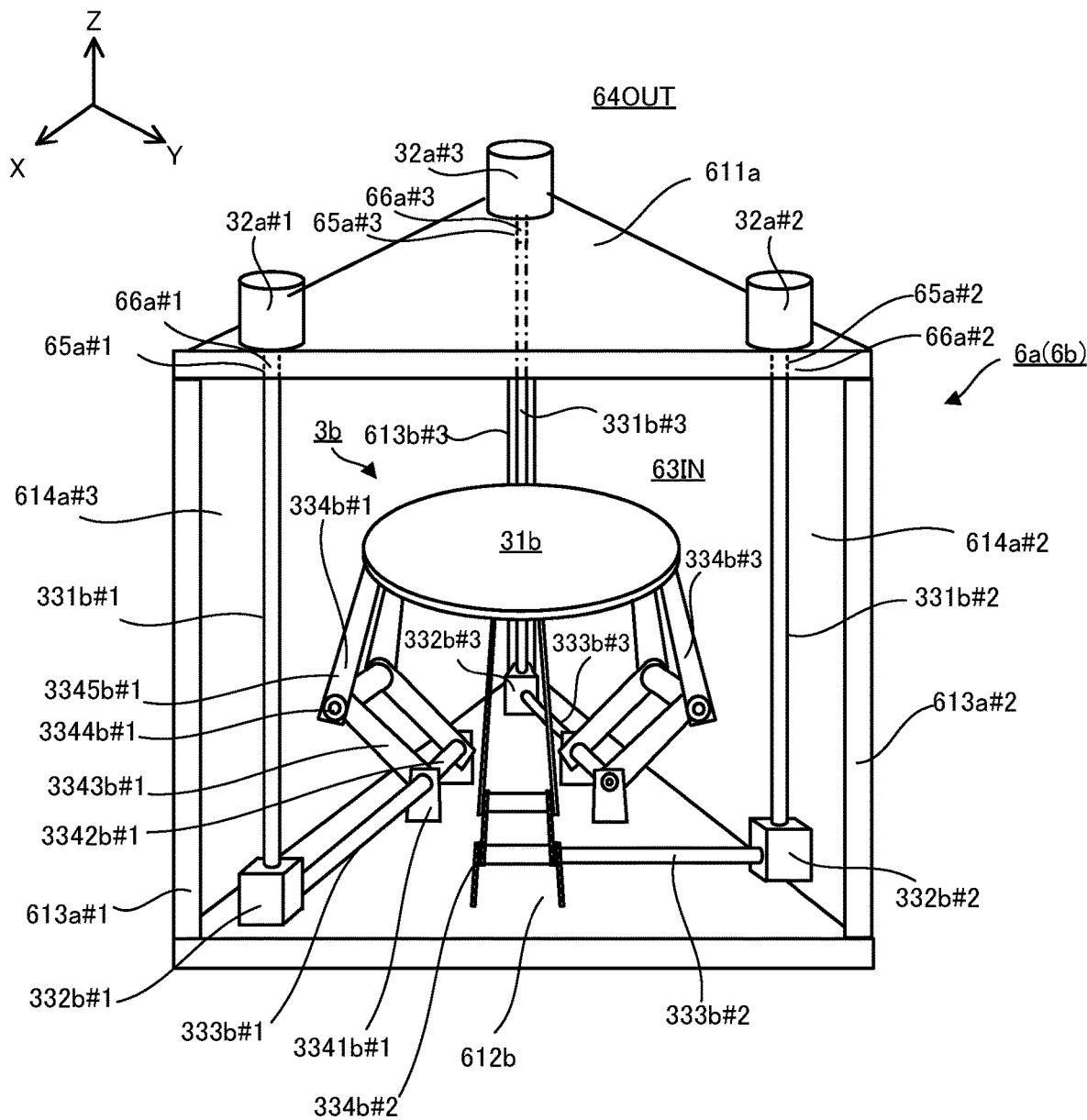
FIG. 5 is a perspective view that illustrates a structure of a second stage apparatus in which an illustration of a part of a partition member is omitted.
Figure 6:
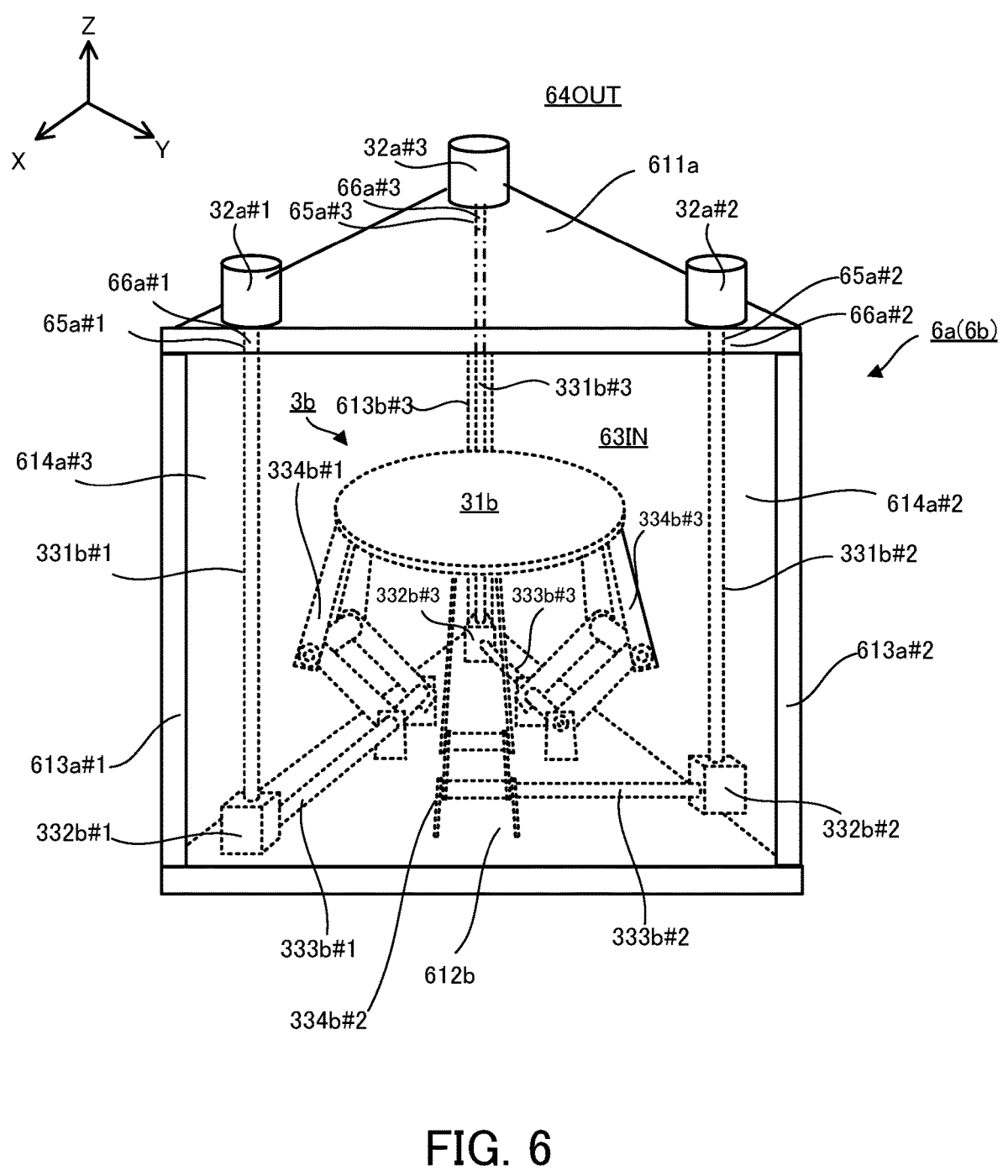

Next, with reference to FIG. 5 and FIG. 6, a structure of the second stage apparatus 3b will be described. FIG. 5 is a perspective view that illustrates the structure of the second stage apparatus 3b in which an illustration of a part of a partition member 61b is omitted. FIG. 6 is a perspective view that illustrates the structure of the second stage apparatus 3b in which the illustration of a part of the partition member 61b is not omitted. Note that a detailed description of a component that is same as that of first stage apparatus 3a is omitted by assigning the same reference number to it.

As illustrated in FIG. 5 and FIG. 6, the second stage apparatus 3b is provided with a stage 31b that is one example of the stage 31. The second stage apparatus 3b is provided with the three motors 32a (specifically, the motors 32a #1 to 32a #3), as with the first stage apparatus 3a. The second stage apparatus 3b is further provided with three driving power transmission member 33b (specifically, a driving power transmission member 33b #1, a driving power transmission member 33b #2 and a driving power transmission member 33b #3) each of which is one example of the driving power transmission member 33. The driving power transmission members 33b #1 to 33b #3 transmit, to the stage 31b, the driving powers that are generated by the motor 32a #1 to 32a #3, respectively.

The driving power transmission member 33b #1 is provided with a drive shaft 331b #1, a bevel gear mechanism 332b #1, a drive shaft 333b #1 and an arm mechanism 334b #1. The driving power transmission member 33b #2 is provided with a drive shaft 331b #2, a bevel gear mechanism 332b #2, a drive shaft 333b #2 and an arm mechanism 334b #2. The driving power transmission member 33b #3 is provided with a drive shaft 331b #3, a bevel gear mechanism 332b #3, a drive shaft 333b #3 and an arm mechanism 334b #3. Note that the drive shaft may be referred to as an axial member.

Each of the drive shafts 331b #1 to 331b #3 is disposed to extend along the Z axis direction. The drive shafts 331b #1 to 331b #3 are connected to the rotational axes of the motor 32a #1 to 32a #3, respectively. The drive shafts 331b #1 to 331b #3 are rotated around the Z axis direction by the motor 32a #1 to 32a #3, respectively. Thus, each of the drive shafts 331b #1 to 331b #3 transmits the driving power along the Z axis direction. The drive shafts 331b #1 to 331b #3 are disposed at or near vertices of an area having a triangular (typically, an equilateral triangular) shape in a plane along an XY plane, respectively.

Rotations of the drive shafts 331b #1 to 331b #3 around the Z axis are transmitted to the drive shafts 333b #1 to 333b #3 by the bevel gear mechanisms 332b #2 to 332b #3, respectively. As a result, each of the drive shafts 333b #1 to 333b #3 is rotated around an axis that intersects with the Z axis. Thus, each of the drive shafts 333b #1 to 333b #3 transmits the driving power along a direction that intersects with the Z axis direction. Rotations of the drive shafts 333b #1 to 333b #3 are transmitted to the arm mechanisms 334b #1 to 334b #3, respectively. Specifically, the arm mechanism 334b #1 is provided with a base member 3341b #1, a joint member 3342b #1, a link member 3343b #1, a joint member 3344b #1 and a link member 3345b #1. The base member 3341b is fixed to the bottom member 612a. The base member 3341b #1 is connected to the link member 3343b #1 by the joint member 3342b #1. The drive shaft 333b #1 is connected to the joint member 3342b #1. Thus, the rotation of the drive shaft 333b #1 is transmitted to the joint member 3342b #1. Here, the joint member 3342b #1 is fixed to the link member 3343b #1. Thus, the link member 3343b #1 moves along with the rotation of the drive shaft 333b #1. The link member 3343b #1 is connected to the link member 3345b #1 through the joint member 3344b #1. Thus, the link member 3345b #1 moves along with the movement of the link member 3343b #1. Moreover, the link member 3345b #1 is connected to the stage 31b. As a result, the stage 31b moves along with the movement of the link member 3345b #1. Although a detailed description is omitted for the simple description, each of the arm mechanism 334b #2 and 334 #3 also has a structure that is same as that of the arm mechanism 334b #1.

When the processing system SYS1 is provided with the second stage apparatus 3b, the processing system SYS1 is provided with, as the housing 6, a housing 6b matching the second stage apparatus 3b. Incidentally, the housing 6b may be same as the above described housing 6a, and thus, a detailed description thereof is omitted. However, when the processing system SYS1 is provided with the second stage apparatus 3b, the drive shafts 331b #1 to 331b #3 extend from the chamber space 63IN to the rotational axes of the motors 32a #1 to 32a #3 through the apertures 65a #1 to 65a #3, respectively, instead of the axial members 331a #1 to 331a #3.

(1-2-3) Structure of Third Stage Apparatus 3c

Figure 7:
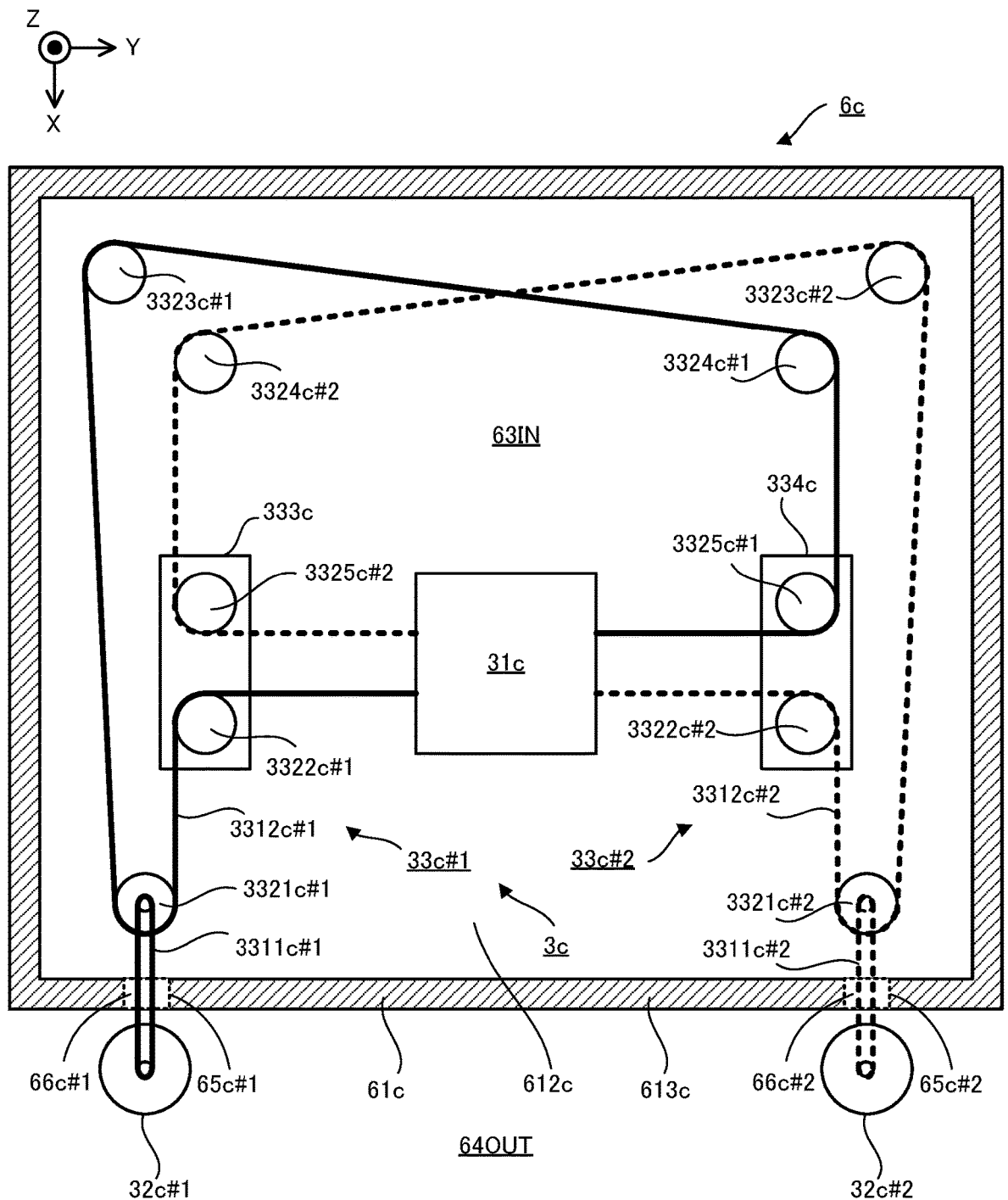
FIG. 7 is a perspective view that illustrates a structure of a third stage apparatus in which an illustration of a part of a partition member is omitted.
Figure 8:
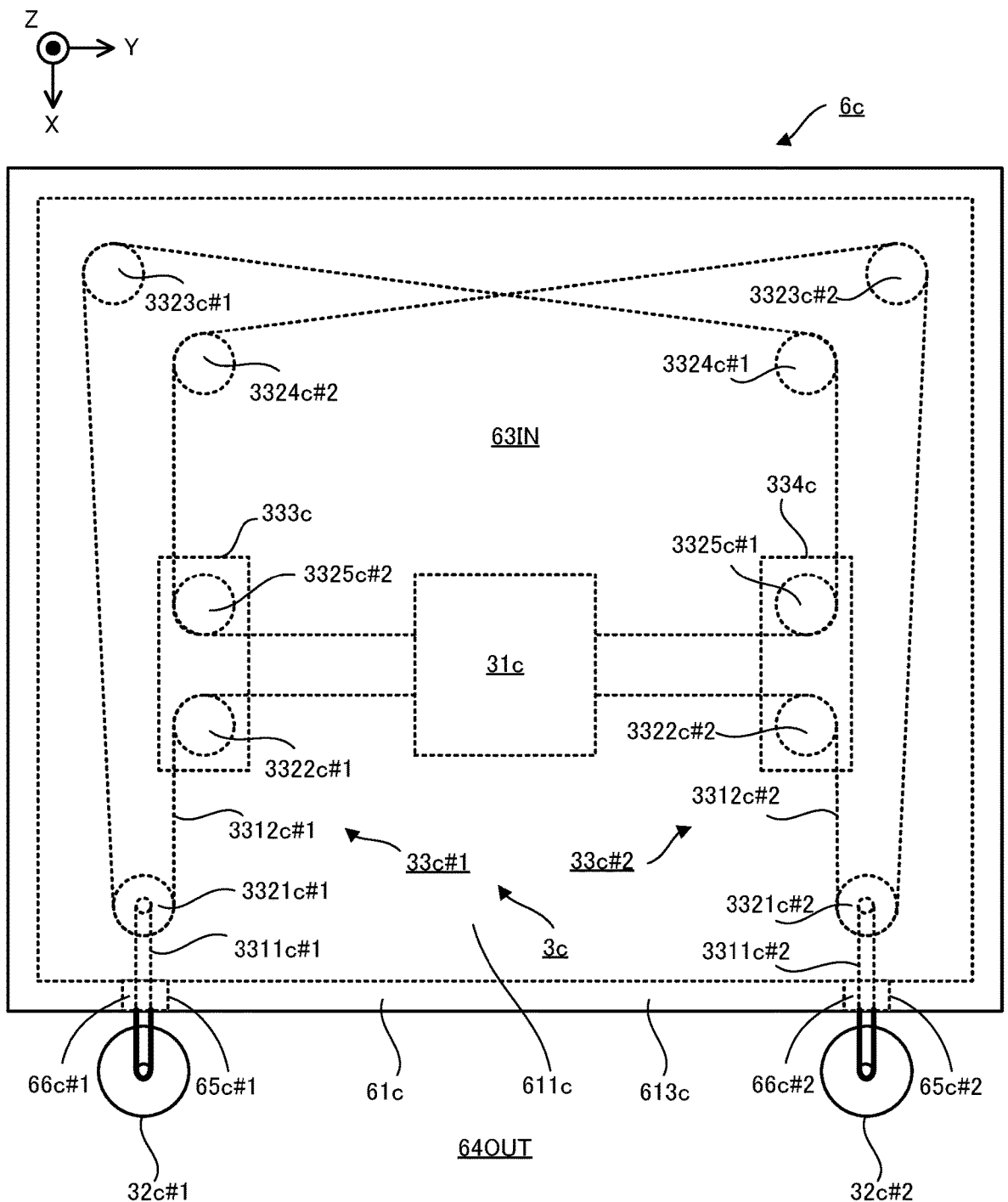
FIG. 8 is a perspective view that illustrates the structure of the third stage apparatus in which the illustration of a part of the partition member is not omitted.

Next, with reference to FIG. 7 and FIG. 8, a structure of the third stage apparatus 3c will be described. FIG. 7 is a perspective view that illustrates the structure of the third stage apparatus 3c in which an illustration of a part of a partition member 61c is omitted. FIG. 8 is a perspective view that illustrates the structure of the third stage apparatus 3c in which the illustration of a part of the partition member 61c is not omitted.

As illustrated in FIG. 7 and FIG. 8, the third stage apparatus 3c is provided with a stage 31c that is one example of the stage 31. The third stage apparatus 3c is further provided with two motors 32c (specifically, a motor 32c #1 and a motor 32c #2) each of which is one example of the driving power source 32. The third stage apparatus 3c is further provided with two driving power transmission member 33c (specifically, a driving power transmission member 33c #1 and a driving power transmission member 33c #2) each of which is one example of the driving power transmission member 33. The driving power transmission members 33c #1 and 33c #2 transmit, to the stage 31c, the driving powers that are generated by the motor 32c #1 and 32c #2, respectively. The third stage apparatus 3c is further provided with a movable base 333c and a movable base 334c.

The driving power transmission member 33c #1 is provided with a belt 3311c #1, a belt 3312c #1, a drive pulley 3321c #1, a bend pulley 3322c #1, a bend pulley 3323c #1, a bend pulley 3324c #1 and a bend pulley 3325c #1. The driving power transmission member 33c #2 is provided with a belt 3311c #2, a belt 3312c #2, a drive pulley 3321c #2, a bend pulley 3322c #2, a bend pulley 3323c #2, a bend pulley 3324c #2 and a bend pulley 3325c #2.

The belt 3311c #1 connects a rotational axis of the motor 32c #1 to a rotational axis of the drive pulley 3321c #1. In an example illustrated in FIG. 7 and FIG. 8, each of the rotational axis of the motor 32c #1 and the rotational axis of the drive pulley 3321c #1 is parallel to the Z axis, and the belt 3311c #1 extends along the X axis direction and connects the rotational axis of the motor 32c #1 to the rotational axis of the drive pulley 3321c #1 along the X axis direction. Therefore, the belt 3311c #1 moves along the X axis direction along with a rotation of the rotational axis of the motor 32c #1. As a result, the drive pulley 3321c #1 is rotated around the Z axis along with a movement of the belt 3311c #1. A rotation of the drive pulley 3321c #1 is transmitted to the belt 3312c #1. One end of the belt 3312c #1 is connected to a −Y side end of the stage 31c. The other end of the belt 3312c #1 is connected to a +Y side end of the stage 31c. The belt 3312c #1 extends from the −Y side end of the stage 31c to the +Y side end of the stage 31c through the bend pulley 3322c #1, the drive pulley 3321c #1, the bend pulley 3323c #1, the bend pulley 3324c #1 and the bend pulley 3325c #1 in this order. In this case, the belt 3312c #1 extends along at least one of a plurality of directions along the XY plane (for example, at least one of the X axis direction and the Y axis direction).

The belt 3311c #2 connects a rotational axis of the motor 32c #2 to a rotational axis of the drive pulley 3321c #2. In the example illustrated in FIG. 7 and FIG. 8, each of the rotational axis of the motor 32c #2 and the rotational axis of the drive pulley 3321c #2 is parallel to the Z axis, and the belt 3311c #2 extends along the X axis direction and connects the rotational axis of the motor 32c #2 to the rotational axis of the drive pulley 3321c #2 along the X axis direction. Therefore, the belt 3311c #2 moves along the X axis direction along with a rotation of the rotational axis of the motor 32c #2. As a result, the drive pulley 3321c #2 is rotated around the Z axis along with a movement of the belt 3311c #2. A rotation of the drive pulley 3321c #2 is transmitted to the belt 3312c #2. One end of the belt 3312c #2 is connected to a −Y side end of the stage 31c. The other end of the belt 3312c #2 is connected to a +Y side end of the stage 31c. The belt 3312c #2 extends from the +Y side end of the stage 31c to the −Y side end of the stage 31c through the bend pulley 3322c #2, the drive pulley 3321c #2, the bend pulley 3323c #2, the bend pulley 3324c #2 and the bend pulley 3325c #2 in this order. In this case, the belt 3312c #2 extends along at least one of a plurality of directions along the XY plane (for example, at least one of the X axis direction and the Y axis direction).

The bend pulleys 3322c #1 and 3325c #2 are disposed on the movable base 333c. The movable base 333c is movable along the XY plane (for example, along at least one of the X axis direction and the Y axis direction) by a force that is applied to the bend pulley 3322c #1 from the belt 3312c #1 and/or a force that is applied to the bend pulley 3325c #2 from the belt 3312c #2.

The bend pulleys 3325c #1 and 3322c #2 are disposed on the movable base 334c. The movable base 334c is movable along the XY plane (for example, along at least one of the X axis direction and the Y axis direction) by a force that is applied to the bend pulley 3325c #1 from the belt 3312c #1 and/or a force that is applied to the bend pulley 3322c #2 from the belt 3312c #2.

In this stage apparatus 3c, a moving direction of the stage 31c is determined on the basis of rotational directions of the rotational axes of the motors 32c #1 and 32c #2.

Specifically, when the rotational axis of each of the motors 32c #1 and 32c #2 is the Z axis and they are rotated in a clockwise direction, the driving power transmission member 33c #1 transmits the driving power that is generated by the motor 32c #1 to the stage 31c as a force that acts to move the stage 31c toward the −Y side and the driving power transmission member 33c #2 transmits the driving power that is generated by the motor 32c #2 to the stage 31c as a force that acts to move the stage 31c toward the −Y side. As a result, the stage 31c moves toward the −Y side.

When the rotational axis of each of the motors 32c #1 and 32c #2 is the Z axis and they are rotated in a counterclockwise direction, the driving power transmission member 33c #1 transmits the driving power that is generated by the motor 32c #1 to the stage 31c as a force that acts to move the stage 31c toward the +Y side and the driving power transmission member 33c #2 transmits the driving power that is generated by the motor 32c #2 to the stage 31c as a force that acts to move the stage 31c toward the +Y side. As a result, the stage 31c moves toward the +Y side.

When the rotational axis of the motor 32c #1 is the Z axis and it is rotated in the clockwise direction but the rotational axis of the motor 32c #2 is the Z axis and it is rotated in the counterclockwise direction, the driving power transmission member 33c #1 transmits the driving power that is generated by the motor 32c #1 to the stage 31c as a force that acts to move the stage 31c toward the −Y side and the driving power transmission member 33c #2 transmits the driving power that is generated by the motor 32c #2 to the stage 31c as a force that acts to move the stage 31c toward the +Y side. Thus, the force that is transmitted to the stage 31c through the driving power transmission member 33c #1 and the force that is transmitted to the stage 31c through the driving power transmission member 33c #2 cancel each other out. As a result, the stage 31c does not move along the Y axis direction. On the other hand, since the stage 31c does not move by the force that is transmitted to the stage 31c through the driving power transmission member 33c #1, this force acts on the bend pulleys 3322c #1 and 3325c #1 as a force that acts to move the bend pulleys 3322c #1 and 3325c #1 toward the +X side. Similarly, since the stage 31c does not move by the force that is transmitted to the stage 31c through the driving power transmission member 33c #2, this force acts on the bend pulleys 3322c #2 and 3325c #2 as a force that acts to move the bend pulleys 3322c #2 and 3325c #2 toward the +X side. As a result, the movable base 333c on which the bend pulleys 3322c #1 and 3325c #1 are disposed and the movable base 334c on which the bend pulleys 3322c #2 and 3325c #2 are disposed move toward the +X side. As a result, the stage 31c moves toward the +X side along with movements of the movable bases 333c and 334c.

When the rotational axis of the motor 32c #1 is the Z axis and it is rotated in the counterclockwise direction but the rotational axis of the motor 32c #2 is the Z axis and it is rotated in the clockwise direction, the driving power transmission member 33c #1 transmits the driving power that is generated by the motor 32c #1 to the stage 31c as a force that acts to move the stage 31c toward the +Y side and the driving power transmission member 33c #2 transmits the driving power that is generated by the motor 32c #2 to the stage 31c as a force that acts to move the stage 31c toward the -Y side. Thus, the force that is transmitted to the stage 31c through the driving power transmission member 33c #1 and the force that is transmitted to the stage 31c through the driving power transmission member 33c #2 cancel each other out. As a result, the stage 31c does not move along the Y axis direction. On the other hand, since the stage 31c does not move by the force that is transmitted to the stage 31c through the driving power transmission member 33c #1, this force acts on the bend pulleys 3322c #1 and 3325c #1 as a force that acts to move the bend pulleys 3322c #1 and 3325c #1 toward the -X side. Similarly, since the stage 31c does not move by the force that is transmitted to the stage 31c through the driving power transmission member 33c #2, this force acts on the bend pulleys 3322c #2 and 3325c #2 as a force that acts to move the bend pulleys 3322c #2 and 3325c #2 toward the -X side. As a result, the movable base 333c on which the bend pulleys 3322c #1 and 3325c #1 are disposed and the movable base 334c on which the bend pulleys 3322c #2 and 3325c #2 are disposed move toward the -X side. As a result, the stage 31c moves toward the -X side along with the movements of the movable bases 333c and 334c.

When the processing system SYS1 is provided with the third stage apparatus 3c, the processing system SYS1 is provided with, as the housing 6, a housing 6c matching the third stage apparatus 3c. Specifically, the housing 6c is provided with a ceiling member 611c, a bottom member 612c and a side wall member 613c each of which constitutes a part of the partition member 61. The ceiling member 611c is a member that forms an upper (namely, the +Z side) border of the chamber space 63IN. The ceiling member 611c is a plate-shaped member along the XY plane, for example. However, an illustration of the ceiling member 611c is omitted in FIG. 7. The bottom member 612c is a member that forms a lower (namely, the -Z side) border of the chamber space 63IN. The bottom member 612c is disposed under the ceiling member 611c. The bottom member 612c is a plate-shaped member along the XY plane, for example. The side wall members 613c is a member that forms a lateral border of the chamber space 63IN. The side wall member 613c is disposed to surround a space between the ceiling member 611c and the bottom member 612c. The side wall member 613c is a tubular (for example, a square tubular) member that extends along the Z axis. As a result, a space that is surrounded by the ceiling member 611c, the bottom member 612c and the side wall member 613c is formed as the chamber space 63IN. Note that a gap between the ceiling member 611c, the bottom member 612c and the side wall member 613c may be sealed by a seal member in order to keep the airtightness of the chamber space 63IN (as a result, to prevent the spark from the motors 32c from entering the chamber space 63IN).

The driving power transmission members 33c #1 and 33c #2 are disposed in the chamber space 63IN. On the other hand, the motors 32c #1 and 32c #2 are disposed in the external space 64OUT. However, the belts 3311c #1 and 3311c #2 extend from the chamber space 63IN to the rotational axes of the motors 32c #1 and 32c #2 through apertures 65c #1 and 65c #2 formed at the ceiling member 611c, respectively. Each of the apertures 65c #1 and 65c #2 is a through hole that extends along the X axis direction to penetrate the ceiling member 611c along the X axis direction (namely, penetrates the ceiling member 611c along a direction that intersects with a surface of the side wall member 613c (namely, a side surface of the housing 6c)). Thus, a part of each of the belts 3311c #1 and 3311c #2 is disposed in the external space 64OUT. Moreover, the apertures 65c #1 and 65c #2 are sealed by seal members 66c #1 and 66c #2 each of which is one example of the seal member 66, respectively. Here, distances between the belts 311c #1 and 311c #2 and the aperture 65a #1 and 65a #2 do not change even when the belts 3111c #1 and 3111c #2 of the driving power transmission members 33c #1 and 33c #2 moves, and thus, an imperfection of sealing by the seal members 66a #1 and 66a #2 is less likely to be caused.

(1-2-4) Structure of Fourth Stage Apparatus 3d

Figure 9:
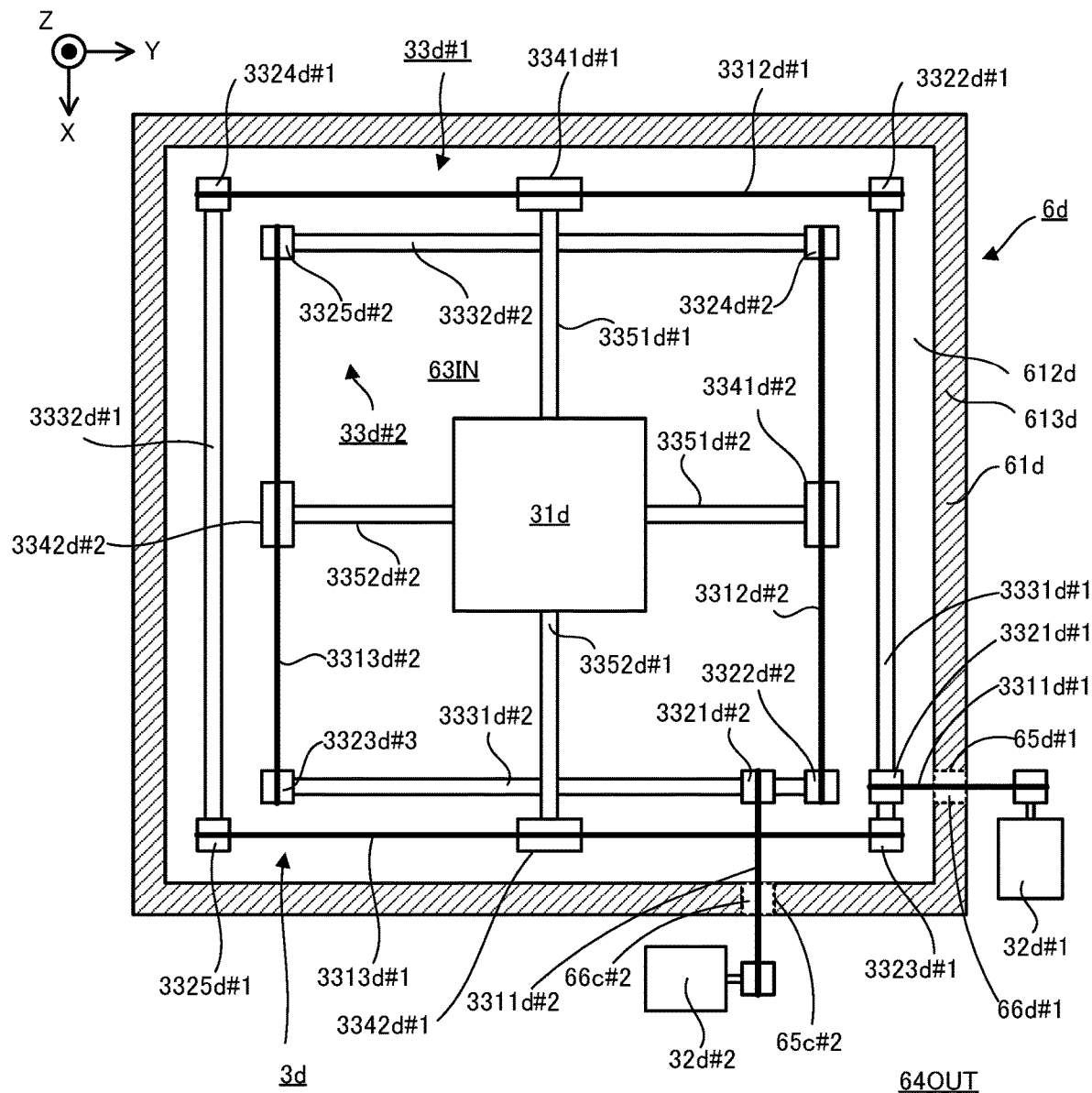
FIG. 9 is a perspective view that illustrates a structure of a fourth stage apparatus in which an illustration of a part of a partition member is omitted.
Figure 10:
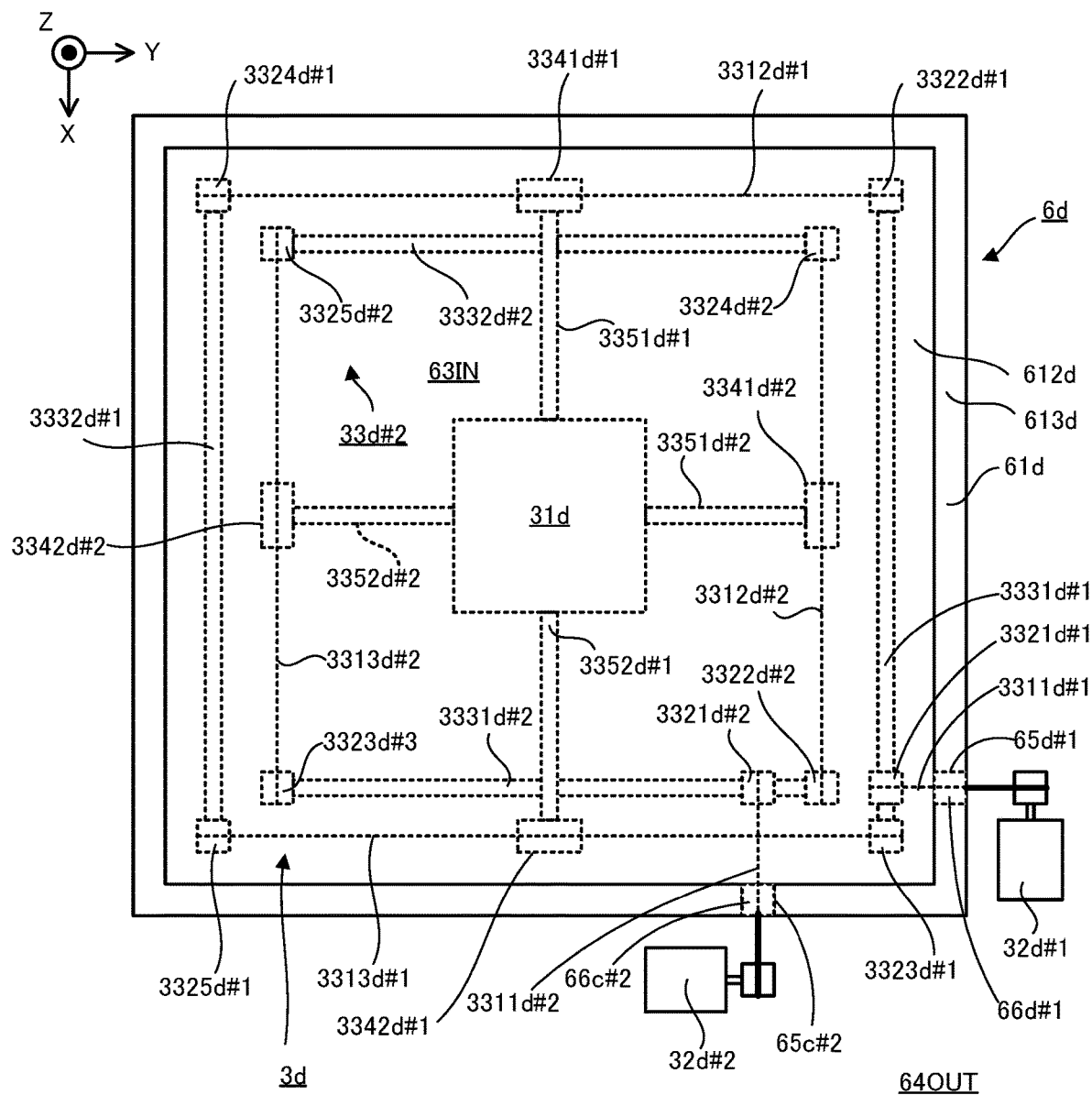
FIG. 10 is a perspective view that illustrates the structure of the fourth stage apparatus in which the illustration of a part of the partition member is not omitted.

Next, with reference to FIG. 9 and FIG. 10, a structure of the fourth stage apparatus 3d will be described. FIG. 9 is a perspective view that illustrates the structure of the fourth stage apparatus 3d in which an illustration of a part of a partition member 61d is omitted. FIG. 10 is a perspective view that illustrates the structure of the fourth stage apparatus 3d in which the illustration of a part of the partition member 61d is not omitted.

As illustrated in FIG. 9 and FIG. 10, the fourth stage apparatus 3d is provided with a stage 31d that is one example of the stage 31. The fourth stage apparatus 3d is further provided with two motors 32d (specifically, a motor 32d #1 and a motor 32d #2) each of which is one example of the driving power source 32. The fourth stage apparatus 3d is further provided with two driving power transmission member 33d (specifically, a driving power transmission member 33d #1 and a driving power transmission member 33d #2) each of which is one example of the driving power transmission member 33. The driving power transmission members 33d #1 and 33d #2 transmit, to the stage 31d, the driving powers that are generated by the motor 32d #1 and 32d #2, respectively.

The driving power transmission member 33d #1 is provided with a belt 3311d #1, a belt 3312d #1, a belt 3313d #1, a pulley 3321d #1, a pulley 3322d #1, a pulley 3323d #1, a pulley 3324d #1, a pulley 3325d #1, a drive shaft 3331d #1, a drive shaft 3332d #1, a movable member 3341d #1, a movable member 3342d #1, a connection member 3351d #1 and a connection member 3352d #1. The driving power transmission member 33d #2 is provided with a belt 3311d #2, a belt 3312d #2, a belt 3313d #2, a pulley 3321d #2, a pulley 3322d #2, a pulley 3323d #2, a pulley 3324d #2, a pulley 3325d #2, a drive shaft 3331d #2, a drive shaft 3332d #2, a movable member 3341d #2, a movable member 3342d #2, a connection member 3351d #2 and a connection member 3352d #2.

The belt 3311d #1 connects a rotational axis of the motor 32d #1 to the pulley 3321d #1. In an example illustrated in FIG. 9 and FIG. 10, each of the rotational axis of the motor 32d #1 and a rotational axis of the pulley 3321d #1 is parallel to the X axis, and the belt 3311d #1 extends along the Y axis direction and connects the rotational axis of the motor 32d #1 to the rotational axis of the pulley 3321d #1 along the Y axis direction. Therefore, the belt 3311d #1 moves along the Y axis direction along with a rotation of the rotational axis of the motor 32d #1. As a result, the pulley 3321d #1 is rotated around the X axis (alternatively, around an axis that intersects with the Z axis) along with a movement of the belt 3311 #1. The drive shaft 3331d #1 that extends along the X axis is connected to the pulley 3321d #1. Thus, the drive shaft 3331d #1 is also rotated around the X axis (alternatively, around an axis that intersects with the Z axis) along with a rotation of the pulley 3321d #1. The pulleys 3322d #1 and 3323d #1 are connected to both ends of the drive shaft 3331d #1, respectively. Thus, each of the pulleys 3322d #1 and 3323d #1 is also rotated around the X axis (alternatively, around an axis that intersects with the Z axis) along with a rotation of the drive shaft 3331d #1.

The belt 3312d #1 extends along the Y axis direction. The belt 3312d #1 connects the pulley 3322d #1 to the pulley 3324d #1 along the Y axis direction. The belt 3313d #1 extends along the Y axis direction. The belt 3313d #1 connects the pulley 3323d #1 to the pulley 3325d #1 along the Y axis direction. The pulleys 3324d #1 and 3325d #1 are connected to both ends of the drive shaft 3332d #1 that extends along the X axis direction. Thu, the pulleys 3324d #1 and 3325d #1 and the drive shaft 3332d #1 are also rotated around the X axis (alternatively, around an axis that intersects with the Z axis) along with rotations of the pulleys 3322d #1 and 3323d #1. As a result, the rotation of the pulley 3322d #1 is converted into a movement of the belt 3312d #1, which connects the pulley 3322d #1 to the pulley 3324d #1, along the Y axis direction. Similarly, the rotation of the pulley 3323d #1 is converted into a movement of the belt 3313d #1, which connects the pulley 3323d #1 to the pulley 3325d #1, along the Y axis direction.

The movable member 3341d #1 is fixed to the belt 3312d #1. Thus, the movable member 3341d #1 moves along the Y axis direction along with the movement of the belt 3312d #1 along the Y axis direction. The movable member 3342d #1 is fixed to the belt 3313d #1. Thus, the movable member 3342d #1 moves along the Y axis direction along with the movement of the belt 3313d #1 along the Y axis direction. The connection member 3351d #1 connects the movable member 3341d #1 to the stage 31d. The connection member 3352d #1 connects the movable member 3342d #1 to the stage 31d. Specifically, the belts 3312d #1 and 3313d #1 and the movable members 3341d #1 and 3342d #1 are disposed so that the stage 31d is sandwiched between the belt 3312d #1 and the belt 3313d #1 along the X axis direction and the stage 31d is sandwiched between the movable member 3341d #1 and the movable member 3342d #1 along the X axis direction. Thus, the connection members 3351d #1 and 3352d #1 are connected to the stage 31d to support the stage 31d along the X axis direction. In this case, the stage 31d moves along the Y axis direction along with movements of the movable members 3341d #1 and 3342d #1 along the Y axis direction. Thus, the motor 32d #1 and the driving power transmission member 33d #1 mainly serve as a driving system for moving the stage 31d along the Y axis direction.

The belt 3311d #2 connects a rotational axis of the motor 32d #2 to the pulley 3321d #2. In the example illustrated in FIG. 9 and FIG. 10, each of the rotational axis of the motor 32d #2 and a rotational axis of the pulley 3321d #2 is parallel to the Y axis, and the belt 3311d #2 extends along the X axis direction and connects the rotational axis of the motor 32d #2 to the rotational axis of the pulley 3321d #2 along the X axis direction. Therefore, the belt 3311d #2 moves along the X axis direction along with a rotation of the rotational axis of the motor 32d #2. As a result, the pulley 3321d #2 is rotated around the Y axis (alternatively, around an axis that intersects with the Z axis) along with a movement of the belt 3311 #2. The drive shaft 3331d #2 that extends along the Y axis is connected to the pulley 3321d #2. Thus, the drive shaft 3331d #2 is also rotated around the Y axis (alternatively, around an axis that intersects with the Z axis) along with a rotation of the pulley 3321d #2. The pulleys 3322d #2 and 3323d #2 are connected to both ends of the drive shaft 3331d #2, respectively. Thus, each of the pulleys 3322d #2 and 3323d #2 is also rotated around the Y axis (alternatively, around an axis that intersects with the Z axis) along with a rotation of the drive shaft 3331d #2.

The belt 3312d #2 extends along the X axis direction. The belt 3312d #2 connects the pulley 3322d #2 to the pulley 3324d #2 along the X axis direction. The belt 3313d #2 extends along the X axis direction. The belt 3313d #2 connects the pulley 3323d #2 to the pulley 3325d #2 along the X axis direction. The pulleys 3324d #2 and 3325d #2 are connected to both ends of the drive shaft 3332d #2 that extends along the Y axis direction. Thu, the pulleys 3324d #2 and 3325d #2 and the drive shaft 3332d #2 are also rotated around the Y axis (alternatively, around an axis that intersects with the Z axis) along with rotations of the pulleys 3322d #2 and 3323d #2. As a result, the rotation of the pulley 3322d #2 is converted into a movement of the belt 3312d #2, which connects the pulley 3322d #2 to the pulley 3324d #2, along the X axis direction. Similarly, the rotation of the pulley 3323d #2 is converted into a movement of the belt 3313d #2, which connects the pulley 3323d #2 to the pulley 3325d #2, along the X axis direction.

The movable member 3341d #2 is fixed to the belt 3312d #2. Thus, the movable member 3341d #2 moves along the X axis direction along with the movement of the belt 3312d #2 along the X axis direction. The movable member 3342d #2 is fixed to the belt 3313d #2. Thus, the movable member 3342d #2 moves along the X axis direction along with the movement of the belt 3313d #2 along the X axis direction. The connection member 3351d #2 connects the movable member 3341d #2 to the stage 31d. The connection member 3352d #2 connects the movable member 3342d #21 to the stage 31d. Specifically, the belts 3312d #2 and 3313d #2 and the movable members 3341d #2 and 3342d #2 are disposed so that the stage 31d is sandwiched between the belt 3312d #2 and the belt 3313d #2 along the X axis direction and the stage 31d is sandwiched between the movable member 3341d #2 and the movable member 3342d #2 along the Y axis direction. Thus, the connection members 3351d #2 and 3352d #2 are connected to the stage 31d to support the stage 31d along the Y axis direction. In this case, the stage 31d moves along the X axis direction along with movements of the movable members 3341d #2 and 3342d #2 along the X axis direction. Thus, the motor 32d #2 and the driving power transmission member 33d #2 mainly serve as a driving system for moving the stage 31d along the X axis direction.

Note that the connection members 3351*d* #1 and 3352*d* #1, which connect the stage 31*d* and the movable members 3341*d* #1 and 3342*d* #1, respectively, along the X axis direction, are extensible along the X axis direction. As a result, the connection members 3351*d* #1 and 3352*d* #1 do not interfere with the movement of the stage 31*d* along the X axis direction along with the movements of the movable members 3341*d* #2 and 3342*d* #2. Similarly, the connection members 3351*d* #2 and 3352*d* #2, which connect the stage 31*d* and the movable members 3341*d* #2 and 3342*d* #2, respectively, along the Y axis direction, are extensible along the Y axis direction. As a result, the connection members 3351*d* #2 and 3352*d* #2 do not interfere with the movement of the stage 31*d* along the Y axis direction along with the movements of the movable members 3341*d* #1 and 3342*d* #1.

When the processing system SYS1 is provided with the fourth stage apparatus 3*d*, the processing system SYS1 is provided with, as the housing 6, a housing 6*d* matching the fourth stage apparatus 3*d*. Specifically, the housing 6*d* is provided with a ceiling member 611*d*, a bottom member 612*d* and a side wall member 613*d* each of which constitutes a part of the partition member 61. The ceiling member 611*d* is a member that forms an upper (namely, the +Z side) border of the chamber space 63IN. The ceiling member 611*d* is a plate-shaped member along the XY plane, for example. However, an illustration of the ceiling member 611*d* is omitted in FIG. 9. The bottom member 612*d* is a member that forms a lower (namely, the −Z side) border of the chamber space 63IN. The bottom member 612*d* is disposed under the ceiling member 611*d*. The bottom member 612*d* is a plate-shaped member along the XY plane, for example. The side wall members 613*d* is a member that forms a lateral border of the chamber space 63IN. The side wall member 613*d* is disposed to surround a space between the ceiling member 611*d* and the bottom member 612*d*. The side wall member 613*d* is a tubular (for example, a square tubular) member that extends along the Z axis. As a result, a space that is surrounded by the ceiling member 611*d*, the bottom member 612*d* and the side wall member 613*d* is formed as the chamber space 63IN. Note that a gap between the ceiling member 611*d*, the bottom member 612*d* and the side wall member 613*d* may be sealed by a seal member in order to keep the airtightness of the chamber space 63IN (as a result, to prevent the spark from the motors 32*d* from entering the chamber space 63IN).

The driving power transmission members 33*d* #1 and 33*d* #2 are disposed in the chamber space 63IN. On the other hand, the motors 32*d* #1 and 32*d* #2 are disposed in the external space 64OUT. However, the belts 3311*d* #1 and 3311*d* #2 extend from the chamber space 63IN to the rotational axes of the motors 32*d* #1 and 32*d* #2 through apertures 65*d* #1 and 65*d* #2 formed at the ceiling member 611*d*, respectively. The aperture 65*d* #1 is a through hole that extends along the Y axis direction to penetrate the ceiling member 611*d* along the Y axis direction (namely, penetrates the ceiling member 611*d* along a direction that intersects with a surface of the side wall member 613*d* (namely, a side surface of the housing 6*d*)). The aperture 65*d* #2 is a through hole that extends along the X axis direction to penetrate the ceiling member 611*d* along the X axis direction (namely, penetrates the ceiling member 611*d* along a direction that intersects with a surface of the side wall member 613*d* (namely, a side surface of the housing 6*d*)). Thus, a part of each of the belts 3311*d* #1 and 3311*d* #2 is disposed in the external space 64OUT. Moreover, the apertures 65*d* #1 and 65*d* #2 are sealed by seal members 66*d* #1 and 66*d* #2 each of which is one example of the seal member 66, respectively. Here, distances between the belts 311*c* #1 and 311*c* #2 and the aperture 65*a* #1 and 65*a* #2 do not change even when the belts 3111*c* #1 and 3111*c* #2 of the driving power transmission members 33*c* #1 and 33*c* #2 moves, and thus, an imperfection of sealing by the seal members 66*a* #1 and 66*a* #2 is less likely to be caused.

(1-3) Processing Operation of Processing System SYS1

Next, a processing operation (namely, an operation for forming the three-dimensional structural object ST) of the processing system SYS1 will be described. As described above, the processing system SYS1 forms the three-dimensional structural object ST by the Laser Metal Deposition. Thus, the processing system SYS1 may form the three-dimensional structural object ST by performing an existing processing operation (a build operation in this case) based on the Laser Metal Deposition. One example of the processing operation of forming the three-dimensional structural object ST by using the Laser Metal Deposition will be briefly described in the below described description.

The processing system SYS1 forms the three-dimensional structural object ST on the workpiece W on the basis of a three-dimensional model data or the like (for example, a CAD (Computer Aided Design) data) of the three-dimensional structural object ST that should be formed. A measured data of the solid object measured by a non-illustrated measurement apparatus disposed in the processing system SYS1 or a measured data by a three-dimensional shape measurement device disposed separately from the processing system SYS1 may be used as the three-dimensional model data. A contact-type of three-dimensional coordinate measurement device having a probe that is movable relative to the workpiece W and is allowed to contact the workpiece W is one example of the three-dimensional shape measurement device. A non-contact-type of three-dimensional measurement device is one example of the three-dimensional shape measurement device. At least one of a Pattern Projection type of three-dimensional measurement device, a Light Section type of three-dimensional measurement device, a Time Of Flight type of three-dimensional measurement device, a Moire Topography type of three-dimensional measurement device, a Holographic Interference type of three-dimensional measurement device, a CT (Computed Tomography) type of three-dimensional measurement device, a MRI (Magnetic Resonance Imaging) type of three-dimensional measurement device and the like is one example of the non-contact-type of three-dimensional measurement device. Note that a STL (Stereo Lithography) format, a VRML (Virtual Reality Modeling language) format, an AMF (Additive manufacturing File format), an IGES (Initial Graphics Exchange Specification) format, a VDA-FS (Association of German Automotive manufactures-Surfaces Interface) format, a HP/GL (Hewlett-Packard Graphics Language) format, a Bitmap format and the like may be used as the three-dimensional model data, for example.

The processing system SYS1 sequentially forms a plurality of layered partial structural objects (it is referred to as a "structural layer" in the below described description) SL that are arranged along the Z axis direction in order to form the three-dimensional structural object ST, for example. For example, the processing system SYS1 forms, one by one, the plurality of structural layers SL that are obtained by slicing the three-dimensional structural object ST along the Z axis direction. As a result, the three-dimensional structural object ST that is a layered structural body in which the plurality of structural layers SL are layered is formed. Next, a flow of an operation for forming the three-dimensional structural object ST by forming the plurality of structural layers SL one by one in sequence will be described.

Figure 11A:
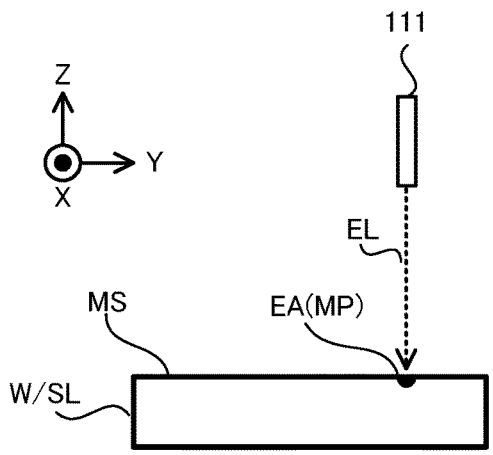
Figure 11B:
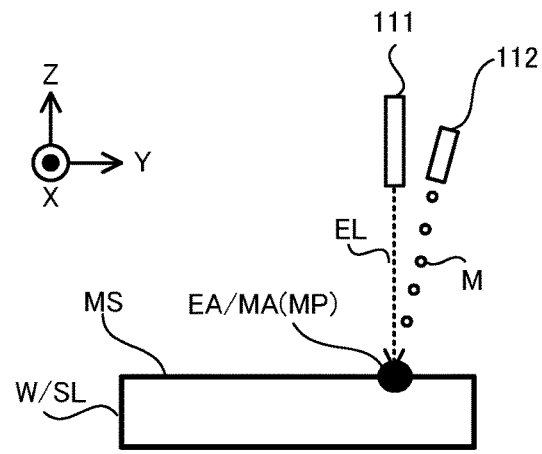
Figure 11C:
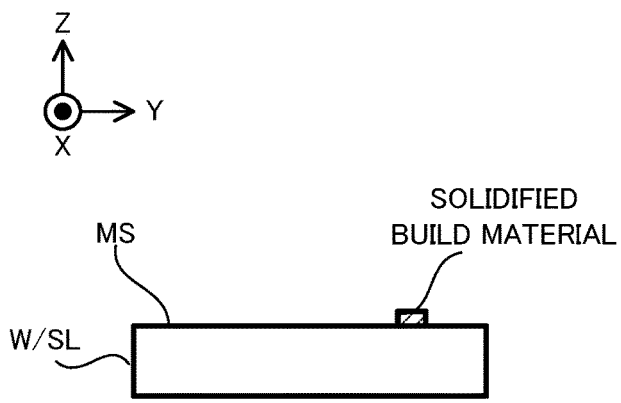

Firstly, with reference to FIG. 11A to FIG. 11E, an operation for forming each structural layer SL will be described. The processing system SYS1 sets the irradiation area EA at a desired area on a build surface MS that corresponds to a surface of the workpiece W or a surface of the formed structural layer SL and emits the processing light EL from the irradiation optical system 211 to the irradiation area EA under the control of the control apparatus 7. Note that an area on the build surface MS that is occupied by the processing light EL emitted from the irradiation optical system 211 may be referred to as the irradiation area EA. In the first embodiment, a light concentration position (namely, a condensed position) of the processing light EL is coincident with the build surface MS. As a result, as illustrated in FIG. 4A, the melt pool (namely, a pool of a metal molten by the processing light EL) MP is formed at the desired area on the build surface MS by the processing light EL emitted from the irradiation optical system 211. Moreover, the processing system SYS1 sets the supply area MA at the desired area on the build surface MS and supplies the build materials M to the supply area MA from the material nozzle 212 under the control of the control apparatus 7. Here, since the irradiation area EA is coincident with the supply area MA as described above, the supply area MA is set at an area at which the melt pool MP is formed. Thus, the processing system SYS1 supplies the build materials M to the melt pool MP from the material nozzle 212, as illustrated in FIG. 11B. As a result, the build materials M supplied to the melt pool MP are molten. When the melt pool MP is not irradiated with the processing light EL due to the movement of the stage 31, the build materials M molten in the melt pool MP are cooled and solidified (namely, coagulated). As a result, as illustrated in FIG. 11C, the solidified build materials M are deposited on the build surface MS. Namely, a build object is formed by a deposition of the solidified build materials M.

Figure 11D:
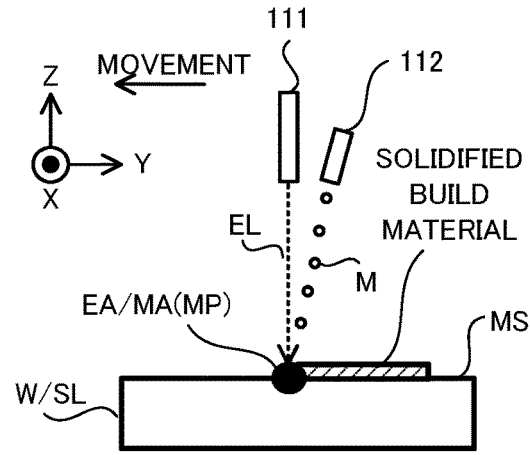
Figure 11E:
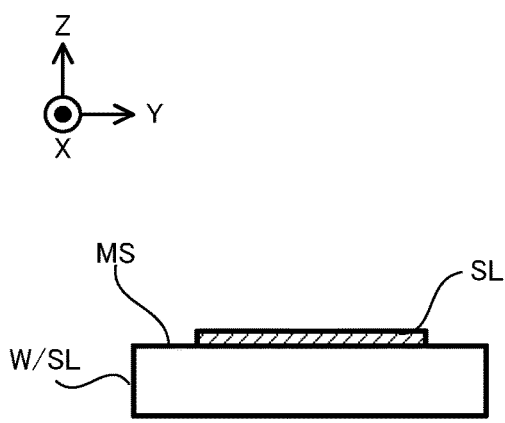

A series of build process including the formation of the melt pool MP by the irradiation of the processing light EL, the supply of the build materials M to the melt pool MP, the melting of the supplied build materials M and the solidification of the molten build materials M is repeated while relatively moving the stage 31 relative to the processing head 21 along the XY plane, as illustrated in FIG. 11D. Namely, when the stage 31 relatively moves relative to the processing head 21, the irradiation area EA also relatively moves relative to the build surface MS. Therefore, the series of build process is repeated while relatively moving the irradiation area EA relative to the build surface MS along the XY plane (namely, in a two-dimensional plane). In this case, the irradiation area EA set at the area on which the build object should be formed on the build surface MS is selectively irradiated with the processing light EL and the irradiation area EA set at an area on which the build object should not be formed on the build surface MS is not selectively irradiated with the processing light EL (it can be said that the irradiation area EA is not set at the area on which the build object should not be formed). Namely, the processing system SYS1 moves the irradiation area EA along a predetermined moving trajectory on the build surface MS and irradiates the build surface MS with the processing light EL at a timing based on an aspect of a distribution of an area on which the build object should be formed. Note that the aspect of the distribution of an area on which the build object should be formed may be referred to as a distribution pattern and a pattern of the structural layer SL. As a result, the melt pool MP also moves on the build surface MS along a moving trajectory based on the moving trajectory of the irradiation area EA. Specifically, the melt pool MP is formed in series at a part that is irradiated with the processing light EL in the area along the moving trajectory of the irradiation area EA on the build surface MS. Moreover, since the irradiation area EA is coincident with the supply area MA as described above, the supply area MA also moves on the build surface MS along a moving trajectory based on the moving trajectory of the irradiation area EA. As a result, as illustrated in FIG. 11E, the structural layer SL that is an aggregation of the build object of the solidified build materials M is formed on the build surface MS. Namely, the structural layer SL that is an aggregation of the build object formed in a pattern based on the moving trajectory of the melt pool MP on the build surface MS (namely, the structural layer SL having a shape based on the moving trajectory of the melt pool MP in a planar view) is formed. Incidentally, when the irradiation area EA is set at the area on which the build object should not be formed, the irradiation area EA may be irradiated with the processing light EL and the supply of the build materials M may be stopped. Moreover, when the irradiation area EA is set at the area on which the build object should not be formed, the build materials M may be supplied to the irradiation area EA and the irradiation area EA may be irradiated with the processing light EL having an intensity by which the melt pool MP is not formed.

The processing system SYS1 repeats the operation for forming the structural layer SL on the basis of the three-dimensional model data under the control of the control apparatus 7. Specifically, a slice data is firstly generated by performing a slicing process on the three-dimensional model data by a layer pitch. Note that a data obtained by partially modifying the slice data on the basis of a characteristic of the processing system SYS1 may be used. The processing system SYS1 performs an operation for forming the first structural layer SL #1 on the build surface MS that corresponds to the surface of the workpiece W on the basis of the three-dimensional model data corresponding to a structural layer SL #1, namely, the slice data corresponding to the structural layer SL #1. For example, the processing system SYS1 may operate by using information, which is in the slice data corresponding to the structural layer SL #1, relating to a tool path that is a trajectory of the irradiation area EA (the supply area MA) passing through an area in which the structural layer SL #1 exists. As a result, as illustrated in FIG. 12A, the structural layer SL #1 is formed on the build surface MS. Then, the processing system SYS1 sets the surface (namely, an upper surface) of the structural layer SL #1 to a new build surface MS and forms a second structural layer SL #2 on the new build surface MS. In order to form the structural layer SL #2, firstly, the control apparatus 7 controls the stage driving system (especially, the driving power source 32) so that the stage 31 moves along the Z axis direction. Specifically, the control apparatus 7 controls the stage driving system to move the stage 31 toward the −Z axis side so that the irradiation area EA and the supply area MA are set on the surface of the structural layer SL #1 (namely, the new build surface MS). By this, the light concentration position of the processing light EL is coincident with the new build surface MS. Then, the processing system SYS1 forms the structural layer SL #2 on the structural layer SL #1 on the basis of the slice data corresponding to the structural layer SL #2 by the operation that is the same as the operation for forming the structural layer SL #1 under the control of the control apparatus 7. As a result, as illustrated in FIG. 12B, the structural layer SL #2 is formed. Then, the same operation is repeated until all structural layers SL constituting the three-dimensional structural object ST that should be formed on the workpiece W are formed. As a result, the three-dimensional structural object ST is formed by a layered structural object in which the plurality of structural layers SL are layered, as illustrated in FIG. 12C.

(1-4) Technical Effect of Processing System SYS1

As described above, the processing system SYS1 in the first embodiment can properly perform the additive processing on the workpiece W. Moreover, in the processing system SYS1, the driving power source 32 having the ignition source is disposed in the external space 64OUT that is separated from the chamber space 63IN by the partition member 61. Thus, it is possible to prevent the explosion caused by the contact between the build materials M in the chamber space 63IN and the ignition source of the driving power source 32.

Incidentally, the chamber space 63IN is the space that is purged by the purge gas during a period when the build materials M are supplied to the chamber space 63IN. Thus, even if the driving power source 32 is disposed in the chamber space 63IN, the explosion is not caused by the contact between the build materials M in the chamber space 63IN and the ignition source of the driving power source 32. However, when the driving power source 32 is disposed at a position that is separated from the chamber space 63IN, the explosion is not caused by the contact between the build materials M in the chamber space 63IN and the ignition source of the driving power source 32 even when the chamber space 63IN is not purged by the purge gas. Thus, the processing system SYS1 achieves such an effect that the stage 31 is movable by using the driving power generated by the driving power source 32 even when the chamber space 63IN is not purged by the purge gas.

(2) Processing System SYS in Second Embodiment

Next, with reference to FIG. 13, the processing system SYS in a second embodiment (in the below description, the processing system SYS in the second embodiment is referred to as a "processing system SYS2") will be described. FIG. 13 is a cross-sectional view that illustrates one example of the structure of the processing system SYS2 in the second embodiment. Note that a detailed description of a component that is same as that of the processing system SYS1 in the first embodiment is omitted by assigning the same reference number to it.

As illustrated in FIG. 13, the processing system SYS2 is different from the processing system SYS1 in that it is provided with a stage apparatus 3e instead of the stage apparats 3. Furthermore, the processing system SYS2 is different from the processing system SYS1 in which the aperture 65 is formed at the housing 6 in that the aperture 65 may not be formed at the housing 6. Another feature of the processing system SYS2 may be same as another feature of the processing system SYS1.

The stage apparatus 3e is different from the stage apparatus 3 in that it is provided with a driving power source 34e instead of the driving power source 32. Furthermore, the stage apparatus 3e is different from the stage apparatus 3 in which the driving power source 32 is disposed in the external space 64OUT (namely, is not disposed in the chamber space 63IN) in that the driving power source 34e may be disposed in the chamber space 63IN. Another feature of the stage apparatus 3e may be same as another feature of the stage apparatus 3.

The driving power source 34e is different from the driving power source 32 that may not have the explosion proof structure in that it has the explosion proof structure. Specifically, the driving power source 34e has the explosion proof structure that prevents the explosion caused by the contact between the build materials M in the chamber space 63IN and the ignition source of the driving power source 34e. For example, the driving power source 34e may have an intrinsic safety explosion proof structure that prevents the explosion of the build materials M in the chamber space 63IN caused by the ignition source of the driving power source 34e. Alternatively, for example, the driving power source 34e may have an increased safety explosion proof structure that increases a structural safety so that the electric spark or the high temperature part is not generated in the chamber space 63IN in which the electric spark or the high temperature part should not be generated. Another feature of the driving power source 34e may be same as another feature of the driving power source 32. Next, with reference to FIG. 14, a structure of the driving power source 34e that has the explosion proof structure will be described. FIG. 14 is a cross-sectional view that illustrates the structure of the driving power source 34e of the processing system SYS2 in the second embodiment.

As illustrated in FIG. 14, the driving power source 34e is provided with a housing 341e, a driving power source 342e and a driving power transmission member 343e.

The housing 341e is a housing apparatus that houses at least the driving power source 342e in a containing space 344e that is an internal space of the housing 341e. The housing 341e includes a partition member 3411e that forms the containing space 344e. The partition member 3411e is a member that separates (namely, isolates) the containing space 344e from an external space of the housing 341e. In the second embodiment, since the driving power source 34e is disposed in the chamber space 63IN, the external space of the housing 341e includes at least a part of the chamber space 63IN. The partition member 3411e faces the containing member through its inner wall and faces the external space of the housing 341e (namely, the chamber space 63IN) through its outer wall. In this case, a space surrounded by the partition member 3411e (more specifically, a space surrounded by the inner wall of the partition member 3411e) is the containing space 344e.

The driving power source 342e is an apparatus that generates the driving power for moving the stage 31. Specifically, the driving power source 342e electrically generates the driving power. Namely, the driving power source 342e generates the driving power by using the electrical current supplied form the non-illustrated electric power source. In other words, the driving power source 342e generates the driving power by converting the electrical current supplied form the non-illustrated electric power source into the driving power. Electrically generates the driving power. A motor is one example of the driving power source 342e. In this case, the driving power source 342e includes the ignition source. The conduction part (for example, the coil) to which the electrical current is supplied is one example of the ignition source, as already described above. Note that the above described driving power source 32 may be used as the driving power source 342e. In this case, it can be said that the driving power source 34e is equivalent to an apparatus that is provided with the housing 341e and the driving power source 32 that is housed in the internal space 344e of the housing 341e.

When the driving power source 342e is disposed in the internal space 344e, the ignition source of the driving power source 342e is also disposed in the internal space 344e. Namely, the ignition source of the driving power source 342e is not disposed in the chamber space 63IN. The ignition source of the driving power source 342e is separated from the chamber space 63IN by the partition member 3411e. The ignition source of the driving power source 342e is disposed at a position that is separated from the chamber space 63IN by the partition member 3411e. In this case, the partition member 3411e is allowed to serve as a member that separates the ignition source of the driving power source 342e from the chamber space 63IN (namely, separates the chamber space 63IN from the ignition source of the driving power source 342e) by surrounding the internal space 344e.

As a result, it is possible to prevent the build materials M (especially, the build materials M that are the powdery materials) supplied to the chamber space 63IN from contacting with the ignition source of the driving power source 342e that is disposed in the internal space 344e. Thus, it is possible to prevent the explosion (typically, the dust explosion) caused by the contact between the build materials M in the chamber space 63IN and the ignition source of the driving power source 342e.

In this case, the housing 341e may have an explosion proof structure that prevents the explosion caused by the contact between the build materials M in the chamber space 63IN and the ignition source of the driving power source 342e. For example, the housing 341e may have an intrinsic safety explosion proof structure that prevents the explosion of the build materials M caused by the electric spark or a high temperature part generated at the ignition source of the driving power source 342e. Alternatively, for example, the housing 341e may have an increased safety explosion proof structure that increases a structural safety so that the electric spark or the high temperature part is not generated in the chamber space 63IN in which the electric spark or the high temperature part should not be generated.

The driving power transmission member 343e is a member that transmits the driving power generated by the driving power source 342e to an outside of the driving power source 34e (especially, the driving power transmission member 33). Since the driving power source 342e is disposed in the internal space 344e of the housing 341e, the driving power transmission member 343e is a member that transmits the driving power generated by the driving power source 342e in the internal space 344e to the outside of the driving power source 34e from the internal space 344e. The driving power transmission member 343e non-electrically transmits the driving power generated by the driving power source 342e. For example, the driving power transmission member 343e may mechanically transmit the driving power generated by the driving power source 342e. For example, the driving power transmission member 343e may transmit the driving power generated by the driving power source 342e by mechanically connecting the driving power source 342e to the driving power transmission member 343e. One example of the member that is configured to mechanically transmit the driving power is already described above. Note that at least a part of the driving power transmission member 33 may be used as the driving power transmission member 343e.

In order to transmit the driving power from the internal space 344e to the chamber space 63IN, an aperture 3412e is formed at the partition member 3411e. The aperture 3412 is a through hole that penetrates the partition member 3411e from the internal space 344e to the chamber space 63IN. A part of the driving power transmission member 343e is disposed in the aperture 3412e. Namely, the driving power transmission member 343e extends from the internal space 344e to the chamber space 63IN through the aperture 3412e. As a result, the driving power transmission member 343e is allowed to transmit the driving power from the internal space 344e to the chamber space 63IN through the aperture 3412e. Namely, the driving power that is generated by the driving power source 342e in the internal space 344e is transmitted to the stage 31 that is disposed in the chamber space 63IN through the aperture 3412e.

When the aperture 3412e is formed at the partition member 3411e, the chamber space 63IN is connected to the internal space 344e through the aperture 3412e. Thus, when a gap (especially, a relatively large gap) exists between a wall surface of the partition member 3411e that forms the aperture 3412e and the driving power transmission member 343e that is disposed in the aperture 3412e, there is a possibility that the build materials M in the chamber space 63IN contact with the ignition source of the driving power source 342e through the aperture 3412e. Thus, the aperture 3412e may be sealed by a seal member 345e. The seal member 345e is a member that seals between the wall surface of the partition member 3411e that forms the aperture 3412e and the driving power transmission member 343e that is disposed in the aperture 3412e. Specifically, the seal member 345e is a member that fills in the gap between the wall surface of the partition member 3411e that forms the aperture 3412e and the driving power transmission member 343e that is disposed in the aperture 3412e. Note that "filling in the gap between the wall surface of the partition member 3411e and the driving power transmission member 343e" may mean "completely eliminating (namely, filling in) the gap between the wall surface of the partition member 3411e and the driving power transmission member 343e", and may mean reducing the gap between the wall surface of the partition member 3411e and the driving power transmission member 343e to the extent that the internal space 344e is sealed. Namely, the seal member 345e may serve as a member that seal the internal space 344e (namely, keeps the airtightness of the internal space 344e). More specifically, the seal member 345e seals the internal space 344e in cooperation with the partition member 3411e and the driving power transmission member 343e. Note that at least one of a gum seal, an oil seal and a labyrinth seal is one example of the seal member 345e.

When the aperture 3412 is sealed by the seal member 345e, it is possible to prevent the build materials M in the chamber space 63IN from contacting with the ignition source of the driving power source 342e through the aperture 3412e. Namely, the seal member 345e may serve as a member that prevents the build materials M in the chamber space 63IN from contacting with the ignition source of the driving power source 342e through the aperture 3412e. Specifically, for example, the seal member 345e may serve as a member that prevents the electric spark generated by the driving power source 342e in the internal space 344e from entering the chamber space 63IN, to which the build materials M are supplied, through the aperture 3412e in cooperation with the partition member 3411e and the driving power transmission member 343e. For example, the seal member 345e may serve as a member that prevents the build materials M that are supplied to the chamber space 63IN from entering the internal space 344e, in which the driving power source 342e including the ignition source is disposed, through the aperture 3412 in cooperation with the partition member 3411e and the driving power transmission member 343e.

As described above, the processing system SYS2 in the second embodiment can properly perform the additive processing on the workpiece W, as with the processing system SYS1 in the first embodiment. Moreover, in the processing system SYS2, the ignition source of the driving power source 34e (for example, the ignition source of the driving power source 342e) is disposed in the internal space 344e that is separated from the chamber space 63IN by the partition member 3411e. Thus, it is possible to prevent the explosion caused by the contact between the build materials M in the chamber space 63IN and the ignition source of the driving power source 34e. Namely, the processing system SYS2 in the second embodiment can achieve an effect that is same as the effect achievable by the processing system SYS1 in the first embodiment. Moreover, in the processing system SYS2, since the driving power source 34e is allowed to be disposed in the chamber space 63IN, a flexibility of an arrangement of the driving power source 34e increases.

Note that the driving power source 34e may be disposed in a position that is different from the chamber space 63IN. For example, the driving power source 34e may be disposed in the external space 64OUT, as with the driving power source in the first embodiment. Alternatively, the processing system SYS2 may be provide with the driving power source 32 that is disposed in the external space 64OUT in addition to the driving power source 34e that is disposed in the chamber space 63IN.

(3) Processing System SYS in Third Embodiment

Next, with reference to FIG. 15 and FIG. 16, the processing system SYS in a fifth embodiment (in the below description, the processing system SYS in the third embodiment is referred to as a "processing system SYS3") will be described. FIG. 15 is a cross-sectional view that illustrates one example of the structure of the processing system SYS3 in the third embodiment. FIG. 16 is a system configuration diagram that illustrates one example system configuration of the processing system SYS3 in the third embodiment. Note that a detailed description of a component that is same as that of the processing system SYS1 in the first embodiment is omitted by assigning the same reference number to it.

As illustrated in FIG. 15 and FIG. 16, the processing system SYS3 is different from at least one of the processing systems SYS1 and SYS2 in that it is provided with a processing apparatus 2f instead of the processing apparats 2. Furthermore, the processing system SYS3 is different from at least one of the processing systems SYS1 and SYS2 in that it is provided with a stage apparatus 3f instead of the stage apparats 3. Another feature of the processing system SYS3 may be same as another feature of at least one of the processing system SYS1.

The processing apparatus 2f is different from the processing apparatus 2 in that it is further provided with a driving power source 22f and a driving power transmission mechanism 23f. The driving power source 22f and the driving power transmission mechanism 23f constitute a head driving system for moving the processing head 21 in the chamber space 63IN. Another feature of the processing apparatus 2f may be same as another feature of the processing apparatus 2.

The driving power source 22f is different from the driving power source 32 that is the apparatus generating the driving power for moving the stage 31 in that it is an apparatus that generates a driving power for moving the processing head 21. Another feature of the driving power source 22f may be same as another feature of the driving power source 32.

The driving power transmission mechanism 23f is different from the driving power transmission member 33 that is the apparatus transmitting the driving power generated by the driving power source 32 to the stage 31 in that it is an apparatus that transmits the driving power generated by the driving power source 22f to the processing head 21. Thus, the driving power transmission mechanism 23f forms a driving power transmission path that extends from the driving power source 22f to the processing head 21. Specifically, the driving power transmission mechanism 23f extends from the driving power source 22f to the processing head, because the driving power transmission mechanism 23f itself is the driving power transmission path. As a result, the processing head 21 moves by the driving power that is transmitted from the driving power source 22f through the driving power transmission mechanism 23f. Another feature of the driving power transmission mechanism 23f may be same as another feature of the driving power transmission member 33.

Note that FIG. 15 illustrates an example in which the processing system 3 is provided with a plurality of (two, in the example illustrated in FIG. 15) driving power sources 22f, however, the processing system 3 may be provided with single driving power source 22f. Similarly, FIG. 15 illustrates an example in which the processing system 3 is provided with a plurality of (two, in the example illustrated in FIG. 15) driving power transmission mechanisms 23f, however, the processing system 3 may be provided with single driving power transmission mechanism 23f.

The driving power source 22f is disposed in the external space 64OUT, as with the driving power source 32. Namely, the driving power source 22f is not disposed in the chamber space 63IN, as with the driving power source 32. Thus, the ignition of the driving power source 22f is not also disposed in the chamber space 63IN. As a result, it is possible to prevent the build materials M (especially, the build materials M that are the powdery materials) supplied to the chamber space 63IN from contacting with the ignition source of the driving power source 22f that is disposed in the external space 64OUT. Thus, it is possible to prevent the explosion (typically, the dust explosion) caused by the contact between the build materials M in the chamber space 63IN and the ignition source of the driving power source 22f.

However, the driving power that is generated by the driving power source 22f in the external space 64OUT needs to be transmitted to the processing head that is disposed in the chamber space 63IN. Thus, the driving power transmission mechanism 23f extends from the external space 64OUT to the chamber space 63IN through the aperture 65, as with the driving power transmission member 33. As a result, the driving power transmission mechanism 23f is allowed to transmit the driving power from the external space 64OUT to the chamber space 63IN through the aperture 65. Namely, the driving power that is generated by the driving power source 22f in the external space 64OUT is transmitted to the processing head 21 that is disposed in the chamber space 63IN through the aperture 65. Moreover, even in the third embodiment, the aperture 65 may be sealed by the seal member 66, as with the first embodiment.

The stage apparatus 3f is different from the stage apparatus 3 in that it may not be provided with the driving power source 32 and the driving power transmission mechanism 33. The stage apparatus 3f is different from the stage apparatus 3e in that it may not be provided with the driving power source 34e and the driving power transmission mechanism 33. However, the stage apparatus 3f may be provided with at least one of the driving power sources 32 and 34e and the driving power transmission mechanism 33. Another feature of the stage apparatus 3f may be same as another feature of the stage apparatus 3 or 3e.

As described above, the processing system SYS3 in the third embodiment can properly perform the additive processing on the workpiece W. Moreover, in the processing system SYS3, the driving power source 22f having the ignition source is disposed in the external space 64OUT that is separated from the chamber space 63IN by the partition member 61. Thus, it is possible to prevent the explosion caused by the contact between the build materials M in the chamber space 63IN and the ignition source of the driving power source 22f. Moreover, the processing system SYS3 can achieve an effect of being allowed to move the processing head 21 by using the driving power that is generated by the driving power source 22f, even when the chamber space 63IN is not purged by the purge gas.

(4) Processing System SYS in Fourth Embodiment

Next, with reference to FIG. 17, the processing system SYS in a fourth embodiment (in the below description, the processing system SYS in the fourth embodiment is referred to as a "processing system SYS4") will be described. FIG. 17 is a cross-sectional view that illustrates one example of the structure of the processing system SYS4 in the fourth embodiment. Note that a detailed description of a component that is same as that of the processing system SYS3 in the third embodiment is omitted by assigning the same reference number to it.

As illustrated in FIG. 17, the processing system SYS4 is different from the processing system SYS3 in that it is provided with a processing apparatus 2g instead of the processing apparats 2f. Furthermore, the processing system SYS4 is different from the processing system SYS3 in which the aperture 65 is formed at the housing 6 in that the aperture 65 may not be formed at the housing 6. Another feature of the processing system SYS4 may be same as another feature of at least one of the processing system SYS3.

The processing apparatus 2g is different from the processing apparatus 2f in that it is further provided with a driving power source 24g instead of the driving power source 22f. Furthermore, the processing apparatus 2g is different from the processing apparatus 2f in which the driving power source 22f is disposed in the external space 64OUT (namely, is not disposed in the chamber space 63IN) in that the driving power source 24g may be disposed in the chamber space 63IN. Another feature of the processing apparatus 2g may be same as another feature of the processing apparatus 2f.

The driving power source 24g is different from the driving power source 22f that may not have the explosion proof structure in that it has the explosion proof structure. Specifically, the driving power source 24g has the explosion proof structure that prevents the explosion caused by the contact between the build materials M in the chamber space 63IN and the ignition source of the driving power source 24g. For example, the driving power source 24g may have an intrinsic safety explosion proof structure that prevents the explosion of the build materials M in the chamber space 63IN caused by the ignition source of the driving power source 24g. Alternatively, for example, the driving power source 24g may have an increased safety explosion proof structure that increases a structural safety so that the electric spark or the high temperature part is not generated in the chamber space 63IN in which the electric spark or the high temperature part should not be generated. The driving power source 24g may have a structure that is same as that of the driving power source 34e described in the second embodiment. Thus, a detailed description of the driving power source 24g is omitted. Another feature of the driving power source 24g may be same as another feature of the driving power source 22f.

As described above, the processing system SYS4 in the fourth embodiment can properly perform the additive processing on the workpiece W, as with the processing system SYS3 in the third embodiment. Moreover, in the processing system SYS4, the ignition source of the driving power source 24g is disposed in a space that is separated from the chamber space 63IN (for example, the internal space 344e that is separated by the partition member 3411e as illustrated in FIG. 14). Thus, it is possible to prevent the explosion caused by the contact between the build materials M in the chamber space 63IN and the ignition source of the driving power source 24g. Namely, the processing system SYS4 in the fourth embodiment can achieve an effect that is same as the effect achievable by the processing system SYS3 in the third embodiment. Moreover, in the processing system SYS4, since the driving power source 24g is allowed to be disposed in the chamber space 63IN, a flexibility of an arrangement of the driving power source 24g increases.

Note that the driving power source 24g may be disposed in a position that is different from the chamber space 63IN. For example, the driving power source 24g may be disposed in the external space 64OUT, as with the driving power source 24f in the third embodiment. Alternatively, the processing system SYS4 may be provide with the driving power source 22f that is disposed in the external space 64OUT in addition to the driving power source 24g that is disposed in the chamber space 63IN.

(5) Modified Example

In the above described description, the driving power transmission member 33 mechanically transmits the driving power that is generated by the driving power source 32 to the stage 31. However, the driving power transmission member 33 may be a driving power transmission using fluid such as a hydraulic driving power transmission apparatus and a pneumatic driving power transmission apparatus.

In the above described description, the processing apparatus 2 melts the build materials M by irradiating the build materials M with the processing light EL. However, the processing apparatus 2 may melt the build materials M by irradiating the build materials M with any energy beam. In this case, the processing apparatus 2 may be provided with a beam irradiation apparatus that is configured to emit any energy beam in addition to or instead of the irradiation optical system 211. Any energy beam includes, but is not limited to, a charged particle beam such as an electron beam and an ion beam or electromagnetic wave.

In the above described description, the processing system SYS is configured to form the three-dimensional structural object ST by the Laser Metal Deposition. However, the processing system SYS may form the three-dimensional structural object ST from the build materials M by another method for forming the three-dimensional structural object ST by irradiating the build materials M with the processing light EL (alternatively, any energy beam). A Powder Bed Fusion such as a Selective Laser Sintering (SLS), a Binder Jetting or a Laser Metal Fusion (LMF) is one example of another method, for example. Alternatively, the processing system SYS may form the three-dimensional structural object ST by any method for the additive processing that is different from the method for forming the three-dimensional structural object ST by irradiating the build materials M with the processing light EL (alternatively, any energy beam).

In the above described description, the processing system SYS forms the three-dimensional structural object ST by supplying the build materials M from the material nozzle 212 to the irradiation area EA that is irradiated with the processing light EL by the irradiation optical system 211. However, the processing system SYS may form the three-dimensional structural object ST by supplying the build materials M from the material nozzle 212 without emitting the processing light EL from the irradiation optical system 211. For example, the processing system SYS may form the three-dimensional structural object ST by spraying the build materials M from the material nozzle 212 to the build surface MS to thereby melt the build materials M on the build surface MS and then solidifying the molten build materials M. For example, the processing system SYS may form the three-dimensional structural object ST by spraying gas including the build materials M at an ultrafast speed from the material nozzle 212 to the build surface MS to thereby melt the build materials M on the build surface MS and then solidifying the molten build materials M. For example, the processing system SYS may form the three-dimensional structural object ST by spraying the heated build materials M from the material nozzle 212 to the build surface MS to thereby melt the build materials M on the build surface MS and then solidifying the molten build materials M. When the three-dimensional structural object ST is formed without emitting the processing light EL from the irradiation optical system 211, the processing system SYS (especially, the processing head 21) may not be provided with the irradiation optical system 211.

Alternatively, the processing system SYS may perform a removal processing that removes at least a part of an object by irradiating the object such as the workpiece W with the processing light EL (alternatively, any energy beam) in addition to or instead of the additive processing. Alternatively, the processing system SYS may perform a marking processing that forms a mark (for example, a character, a number or a graphic) on at least a part of an object by irradiating the object such as the workpiece W with the processing light EL (alternatively, any energy beam) in addition to or instead of at least one of the additive processing and the removal processing. Even in these cases, the above described effect is achievable.

(6) Supplementary Note

With respect to the embodiments described above, the following Supplementary Notes will be further disclosed.
[Supplementary Note 1]
A processing system comprising:
a processing apparatus that performs an additive processing in a processing space in which an object is housed; and
a driving power generation apparatus that generates a driving power for changing a relative position of the object and the processing apparatus,
a part of the driving generation apparatus that is an ignition source being disposed in a separated space that is separated from the processing space by a wall member.

[Supplementary Note 2]
The processing system according to the supplementary note 1, wherein
the wall member includes a first member that separates the processing space from the separated space by surrounding the processing space.
[Supplementary Note 3]
The processing system according to the supplementary note 2, wherein
the processing space is located inside a space that is surrounded by the first member,
the separated space is located outside the space that is surrounded by the first member.
[Supplementary Note 4]
The processing system according to the supplementary note 2 or 3, wherein
the driving power generation apparatus is disposed in the separated space.
[Supplementary Note 5]
The processing system according to any one of the supplementary notes 1 to 4, wherein
the wall member includes a second member that separates the separated space from the processing space by surrounding the separated space.
[Supplementary Note 6]
The processing system according to the supplementary note 5, wherein
the driving power generation apparatus has an explosion proof structure in which an explosion proof measurement is secured by the second member.
[Supplementary Note 7]
The processing system according to the supplementary note 5 or 6, wherein
the driving power generation apparatus includes an explosion proof motor.
[Supplementary Note 8]
The processing system according to any one of the supplementary notes 5 to 7, wherein
the second member includes a housing of the driving power generation apparatus,
the separated space includes an internal space of the housing.
[Supplementary Note 9]
The processing system according to any one of the supplementary notes 5 to 8, wherein
the driving power generation apparatus is disposed in the processing space.
[Supplementary Note 10]
The processing system according to any one of the supplementary notes 5 to 9, wherein
the second member is disposed in the processing space.
[Supplementary Note 11]
The processing system according to any one of the supplementary notes 1 to 10, wherein
the wall member has an explosion proof structure.
[Supplementary Note 12]
The processing system according to any one of the supplementary notes 1 to 11, wherein
the relative position is changed by moving at least one of the object and the processing apparatus in the processing space by using the driving power.
[Supplementary Note 13]
The processing system according to any one of the supplementary notes 1 to 12 further comprising a driving power transmission mechanism that transmits the driving power to at least one of the object and the processing apparatus.

[Supplementary Note 14]
The processing system according to the supplementary note 13, wherein
at least a part of the driving power transmission mechanism is disposed in the processing space.

[Supplementary Note 15]
The processing system according to the supplementary note 13 or 14, wherein
at least a part of the driving power transmission mechanism is disposed in the separated space.

[Supplementary Note 16]
The processing system according to any one of the supplementary notes 13 to 15, wherein
the driving power transmission mechanism does not have an ignition source.

[Supplementary Note 17]
The processing system according to any one of the supplementary notes 13 to 16, wherein
the driving power transmission mechanism non-electrically transmits the driving power.

[Supplementary Note 18]
The processing system according to any one of the supplementary notes 13 to 17, wherein
an aperture that is sealed by a seal member is formed at the wall member,
the driving power transmission mechanism transmits the driving power to at least one of the object and the processing apparatus through the aperture.

[Supplementary Note 19]
The processing system according to the supplementary note 18, wherein
the driving power transmission mechanism extends from the separated space to the processing space through the aperture.

[Supplementary Note 20]
The processing system according to any one of the supplementary notes 1 to 19, wherein
the part of the driving generation apparatus that is the ignition source includes a part to which electrical current is supplied to generate the driving power.

[Supplementary Note 21]
The processing system according to any one of the supplementary notes 1 to 20, wherein
the part of the driving generation apparatus that is the ignition source includes a part that generates heat when the driving power is generated.

[Supplementary Note 22]
The processing system according to any one of the supplementary notes 1 to 21, wherein
the processing apparatus performs the additive processing on a processing target object,
the object includes the processing target object.

[Supplementary Note 23]
The processing system according to any one of the supplementary notes 1 to 22, wherein
the processing apparatus performs the additive processing on a processing target object,
the processing system further comprises a placing apparatus on which the processing target object is placed,
the object includes the placing apparatus.

[Supplementary Note 24]
The processing system according to any one of the supplementary notes 1 to 24, wherein
the processing apparatus has an irradiation apparatus that emits an energy beam in the processing space and a supply apparatus that supplies a material to an irradiation position of the energy beam.

[Supplementary Note 25]
The processing system according to the supplementary note 24, wherein
the material includes a powdery material.

[Supplementary Note 26]
A processing system comprising:
a placing apparatus on which an object is placed;
a processing apparatus that performs an additive processing on the object by supplying powdery materials to the object;
a driving power source that generates a driving power;
a separation member that is disposed between the driving power source and at least a part of the processing apparatus;
a driving power transmission member that transmits the driving power to at least one of the placing apparatus and the processing apparatus through a through hole that is formed at the separation member; and
a seal member that prevents an electric spark from entering a space in which the placing apparatus is located from a space in which the driving power source is located.

[Supplementary Note 27]
A processing system comprising:
a placing apparatus on which an object is placed;
a processing apparatus that performs an additive processing on the object by supplying powdery materials to the object;
a driving power source that generates a driving power;
a separation member that is disposed between the driving power source and at least a part of the processing apparatus;
a driving power transmission member that transmits the driving power to at least one of the placing apparatus and the processing apparatus through a through hole that is formed at the separation member; and
a seal member that prevents the powdery materials from entering a space in which the driving power source is located from a space in which the placing apparatus is located to.

[Supplementary Note 28]
A processing system comprising:
a placing apparatus on which an object in a first space is placed;
a processing apparatus that performs an additive processing on the object in the first space by supplying powdery materials to the object;
a driving power source that is disposed in a second space and that generates a driving power;
a separation member that is disposed between the first space and the second space;
a driving power transmission member that transmits the driving power to at least one of the placing apparatus and the processing apparatus through a through hole that is formed at the separation member; and
a seal member that seals between the driving power transmission member and the separation member.

[Supplementary Note 29]
A processing system comprising:
a placing apparatus on which an object in a first space is placed;
a processing apparatus that performs an additive processing on the object in the first space by supplying powdery materials to the object;
a driving power source that is disposed in a second space and that generates a driving power;

a separation member that is disposed between the first space and the second space;

a driving power transmission member that transmits the driving power to at least one of the placing apparatus and the processing apparatus through a through hole that is formed at the separation member; and a seal member that prevents an electric spark from entering the first space from the second space.

[Supplementary Note 30]

A processing system comprising:

a placing apparatus on which an object in a first space is placed;

a processing apparatus that performs an additive processing on the object in the first space by supplying powdery materials to the object;

a driving power source that is disposed in a second space and that generates a driving power;

a separation member that separates the first space from the second space;

a driving power transmission member that transmits the driving power to at least one of the placing apparatus and the processing apparatus through a through hole that is formed at the separation member; and a seal member that prevents an electric spark from entering the first space from the second space.

[Supplementary Note 31]

A processing system comprising:

a placing apparatus on which an object in a first space is placed;

a processing apparatus that performs an additive processing on the object in the first space by supplying powdery materials to the object;

a driving power source that is disposed in a second space and that generates a driving power;

a separation member that is disposed between the first space and the second space;

a driving power transmission member that transmits the driving power to at least one of the placing apparatus and the processing apparatus through a through hole that is formed at the separation member; and a seal member that prevents powders from entering the first space from the second space.

[Supplementary Note 32]

A processing method of performing the additive processing by using the processing system according to any one of the supplementary notes 1 to 31.

[Supplementary Note 33]

A processing method comprising:

placing an object on a placing apparatus;

performing an additive processing on the object by supplying powdery materials to the object;

generating a driving power by using a driving power source;

disposing a separation member between the driving power source and a space in which the additive processing is performed;

transmitting the driving power to at least one of the placing apparatus and the processing apparatus by using a driving power transmission member that passes through a through hole that is formed at the separation member; and sealing between the driving power transmission member and the separation member.

[Supplementary Note 34]

A processing method comprising:

placing an object on a placing apparatus;

performing an additive processing on the object by supplying powdery materials to the object;

generating a driving power by using a driving power source;

disposing a separation member between the driving power source and a space in which the additive processing is performed;

transmitting the driving power to at least one of the placing apparatus and the processing apparatus by using a driving power transmission member that passes through a through hole that is formed at the separation member; and preventing an electric spark from entering a space in which the placing apparatus is located from a space in which the driving power source is located.

[Supplementary Note 35]

A processing method comprising:

placing an object on a placing apparatus;

performing an additive processing on the object by supplying powdery materials to the object;

generating a driving power by using a driving power source;

disposing a separation member between the driving power source and a space in which the additive processing is performed;

transmitting the driving power to at least one of the placing apparatus and the processing apparatus by using a driving power transmission member that passes through a through hole that is formed at the separation member; and preventing powders from entering a space in which the driving power source is located from a space in which the placing apparatus is located.

[Supplementary Note 36]

A processing method comprising:

placing an object on a placing apparatus in a first space;

performing an additive processing on the object in the first space by supplying powdery materials to the object;

generating a driving power by a driving power source that is disposed in a second space;

disposing a separation member between the first space and the second space;

transmitting the driving power to at least one of the placing apparatus and the processing apparatus by using a driving power transmission member that passes through a through hole that is formed at the separation member; and sealing between the driving power transmission member and the separation member.

[Supplementary Note 37]

A processing method comprising:

placing an object on a placing apparatus in a first space;

performing an additive processing on the object in the first space by supplying powdery materials to the object;

generating a driving power by a driving power source that is disposed in a second space;

disposing a separation member between the first space and the second space;

transmitting the driving power to at least one of the placing apparatus and the processing apparatus by using a driving power transmission member that passes through a through hole that is formed at the separation member; and preventing an electric spark from entering the first space from the second space.

[Supplementary Note 38]

A processing method comprising:
placing an object on a placing apparatus in a first space;
performing an additive processing on the object in the first space by supplying powdery materials to the object;
generating a driving power by a driving power source that is disposed in a second space;
separating the first space from the second space by a separation member;
transmitting the driving power to at least one of the placing apparatus and the processing apparatus by using a driving power transmission member that passes through a through hole that is formed at the separation member; and
preventing an electric spark from entering the first space from the second space.

[Supplementary Note 39]

A processing method comprising:
placing an object on a placing apparatus in a first space;
performing an additive processing on the object in the first space by supplying powdery materials to the object;
generating a driving power by a driving power source that is disposed in a second space;
disposing a separation member between the first space and the second space;
transmitting the driving power to at least one of the placing apparatus and the processing apparatus by using a driving power transmission member that passes through a through hole that is formed at the separation member; and
preventing powders from entering the second space from the first space.

At least a part of the features of each embodiment described above may be properly combined with at least another a part of the features of each embodiment described above. A part of the features of each embodiment described above may not be used. Moreover, the disclosures of all publications and United States patents that are cited in each embodiment described above are incorporated in the disclosures of the present application by reference if it is legally permitted.

The present invention is not limited to the above described examples and is allowed to be changed, if desired, without departing from the essence or spirit of the invention which can be read from the claims and the entire specification. A processing system and a processing method, which involve such changes, are also intended to be within the technical scope of the present invention.

DESCRIPTION OF REFERENCE CODES

SYS processing system
1 material supply apparatus
2 processing apparatus
22f, 24g driving power source
23f driving power transmission member
3 stage apparatus
31 stage
32, 34e driving power transmission member
33 driving power transmission mechanism
6 housing
61 partition member
63IN chamber space
64OUT external space
65 aperture
66 seal member
W workpiece
M build material
SL structural layer
MS build surface
EA irradiation area
MA supply area
MP melt pool
EL processing light

The invention claimed is:

1. A processing system comprising:
a support apparatus that supports an object by a support surface;
a processing apparatus that is disposed at a position away from the support surface along a first direction and that performs an additive processing based on a LMD (Laser Metal Deposition) method on the object by supplying powdery materials to the object;
a driving power source that generates a driving power;
a driving power transmission member that transmits the driving power to at least one of the support apparatus and the processing apparatus to change a positional relationship between the support surface and the processing apparatus along a direction intersecting the first direction;
a partition member that is disposed between the driving power source and at least a part of at least one of the support apparatus and the processing apparatus and that has a formed through hole which the driving power transmission member penetrates; and
a seal member that seals between the driving power transmission member and the partition member, wherein
the driving power transmission member includes an axial member, and
the driving power transmission member transmits the driving power (i) so that the support surface rotates around an axis that crosses the first direction at a right angle to incline the support surface with respect to the processing apparatus, and (ii) so that the support apparatus moves along a direction intersecting an extending direction of the axial member.

2. The processing system according to claim 1, wherein the partition member and the seal member prevent a spark from entering a space in which the support apparatus is located from a space in which the driving power source is located.

3. The processing system according to claim 1, wherein the partition member and the seal member prevent the powdery materials from entering a space in which the driving power source is located from a space in which the support apparatus is located.

4. The processing system according to claim 1, wherein the partition member and the seal member prevent the powdery materials from entering a space in which the driving power source is located from a space to which the powdery materials are supplied.

5. The processing system according to claim 1, wherein the partition member, the driving power transmission member and the seal member seal a space around the object.

6. The processing system according to claim 1, wherein the partition member, the driving power transmission member and the seal member seal a space in which the support apparatus is located.

7. The processing system according to claim 1, wherein the partition member, the driving power transmission member and the seal member seal a space around the driving power source.

8. The processing system according to claim 1, wherein the driving power transmission member transmits the driving power in a direction that intersects with a surface at which the through hole is formed.

9. The processing system according to claim 1, wherein the extending direction of the axial member intersects with a surface at which the through hole is formed.

10. The processing system according to claim 9, wherein the axial member is rotatable around the extending direction.

11. The processing system according to claim 9, wherein the axial member is movable along the extending direction.

12. The processing system according to claim 1, wherein the driving power transmission member transmits the driving power in a direction in which the through hole extends.

13. The processing system according to claim 1, wherein the extending direction of the axial member is a direction in which the through hole extends.

14. The processing system according to claim 13, wherein the axial member is rotatable around the extending direction.

15. The processing system according to claim 13, wherein the axial member is movable along the extending direction.

16. The processing system according to claim 1, wherein at least one of a relative position and a relative attitude of the object and the processing apparatus is changed by the driving power that is transmitted to at least one of the support apparatus and the processing apparatus.

17. The processing system according to claim 1, wherein the driving power source electrically generates the driving power.

18. The processing system according to claim 17, wherein the partition member separates a conduction part of the driving power source from a space in which the additive processing is performed on the object.

19. The processing system according to claim 1, wherein a space in which the additive processing is performed on the object is filled with inert gas.

20. The processing system according to claim 1, wherein an oxygen concentration in a space in which the additive processing is performed on the object is equal to or lower than 0.5%.

21. The processing system according to claim 1, wherein an oxygen concentration in a space in which the driving power source is located is higher than an oxygen concentration in a space in which the additive processing is performed on the object.

22. The processing system according to claim 1, wherein a pressure in a space in which the additive processing is performed on the object is higher than a pressure in a different space.

* * * * *